United States Patent [19]

Holloway et al.

[11] Patent Number: 5,504,416
[45] Date of Patent: Apr. 2, 1996

[54] BATTERY CHARGER CIRCUIT INCLUDING BATTERY TEMPERATURE CONTROL

[75] Inventors: Peter R. Holloway, Andover, Mass.; Robert A. Mammano, Costa Mesa, Calif.

[73] Assignee: Unitrode Corporation, Billerica, Mass.

[21] Appl. No.: 168,268

[22] Filed: Dec. 15, 1993

[51] Int. Cl.$^6$ ........................................ H02J 7/06
[52] U.S. Cl. .................. 320/31; 320/22; 320/35; 320/20; 320/40
[58] Field of Search .................... 320/20, 22, 23, 320/24, 31, 32, 35, 36, 39, 40

[56] References Cited

U.S. PATENT DOCUMENTS

| | | | |
|---|---|---|---|
| 3,531,706 | 9/1970 | Mullersman | 320/20 |
| 3,599,071 | 8/1971 | Lapuyade et al. | 320/35 |
| 3,732,481 | 5/1973 | Mas | 320/14 |
| 4,074,170 | 2/1978 | Orban | 315/120 |
| 4,100,475 | 7/1978 | Gansert et al. | 320/35 |
| 4,114,083 | 9/1978 | Benham et al. | 320/39 |
| 4,151,454 | 4/1979 | Iida | 320/48 |
| 4,153,867 | 5/1979 | Jungfer et al. | 320/43 |
| 4,209,736 | 6/1980 | Reidenbach | 320/22 |
| 4,229,687 | 10/1980 | Newman | 320/2 |
| 4,371,827 | 2/1983 | Mullersman et al. | 320/48 |
| 4,424,476 | 1/1984 | Mullersman | 320/36 |
| 4,433,278 | 2/1984 | Lowndes et al. | 320/48 |
| 4,484,103 | 11/1984 | Credelle | 313/422 |
| 4,513,238 | 4/1985 | Orban | 320/23 |
| 4,572,878 | 2/1986 | Daugherty | 429/62 |
| 4,616,171 | 10/1986 | Hernandez et al. | 320/30 |
| 4,667,143 | 5/1987 | Cooper et al. | 320/22 |
| 4,670,703 | 6/1987 | Williams | 320/22 |
| 4,677,363 | 6/1987 | Kopmann | 320/44 |
| 4,692,682 | 9/1987 | Lane et al. | 320/35 |
| 4,710,694 | 12/1987 | Sutphin et al. | 320/21 |
| 4,749,934 | 6/1988 | Alexander et al. | 320/13 |
| 4,767,977 | 8/1988 | Fasen et al. | 320/20 |
| 4,816,737 | 3/1989 | Delmas et al. | 320/35 |
| 4,876,495 | 10/1989 | Palanisamy et al. | 320/18 |
| 5,012,176 | 4/1991 | LaForge | 320/31 |
| 5,057,762 | 10/1991 | Goedken et al. | 320/15 |
| 5,079,716 | 1/1992 | Lenhardt et al. | 364/483 |
| 5,121,047 | 6/1992 | Goedken et al. | 320/39 |
| 5,122,722 | 6/1992 | Goedken et al. | 320/22 |
| 5,166,595 | 11/1992 | Leverich | 320/32 |
| 5,166,596 | 11/1992 | Goedken | 320/35 |
| 5,166,623 | 11/1992 | Ganio | 324/427 |
| 5,168,205 | 12/1992 | Kan et al. | 320/22 |
| 5,173,652 | 12/1992 | Henkel | 320/2 |
| 5,175,485 | 12/1992 | Joo | 320/32 |
| 5,180,962 | 1/1993 | Giancaterino et al. | 320/35 |

(List continued on next page.)

FOREIGN PATENT DOCUMENTS 0311460 12/1989 European Pat. Off. .

Primary Examiner—Peter S. Wong
Assistant Examiner—Patrick B. Law
Attorney, Agent, or Firm—Weingarten, Schurgin, Gagnebin & Hayes

[57] ABSTRACT

An adaptive battery charger circuit including a state machine adjusts the charging current in accordance with the battery charge acceptance. The battery charging cycle includes an initial charging phase characterized by a relatively high charge acceptance, an intermediate charging phase characterized by a decreasing charge acceptance and a rising battery temperature, and a final charging phase characterized by the battery being at substantially full charge and the charge acceptance approaching zero. Each charging phase corresponds to one or more states of the state machine. Multiple sets of conditions causing transitions between the states of operation are derived from a model of a battery under charge which relates charge acceptance, battery temperature, and cumulative supplied charge. During the intermediate charging phase, the charging current is adjusted to maintain a predetermined battery temperature for a predetermined duration. With this arrangement, the maximum product of charging current and charge acceptance maintainable for the battery without exceeding a safe temperature is continuously achieved.

25 Claims, 20 Drawing Sheets

U.S. PATENT DOCUMENTS

| | | | |
|---|---|---|---|
| 5,185,566 | 2/1993 | Goedken et al. | 320/48 |
| 5,187,425 | 2/1993 | Tanikawa | 320/31 |
| 5,193,067 | 3/1993 | Sato et al. | 364/483 |
| 5,196,780 | 3/1993 | Pacholok | 320/40 |
| 5,206,579 | 4/1993 | Kawate et al. | 320/20 |
| 5,339,018 | 8/1994 | Brokaw | 320/35 |
| 5,376,873 | 12/1994 | Toya | 320/20 |

BATTERY CHARGER CIRCUIT INCLUDING BATTERY TEMPERATURE CONTROL

FIELD OF THE INVENTION

This invention relates generally to battery charger circuits and, more particularly, to a circuit for adjusting the current supplied to a battery under charge to optimize the charging rate.

BACKGROUND OF THE INVENTION

As is known in the art of rechargeable batteries, referred to also as secondary storage cells, not all of the current supplied to the battery is recoverable, or utilized in the chemical reactions by which the battery is charged. The percentage of incremental input current, or charge, that is recoverable at any given point in the charge cycle is referred to as the charge acceptance of the battery. The cumulative charge accepted by the battery determines the battery state of charge (i.e., a percentage of full charge).

One technique for determining the state of charge of a rechargeable battery, described in U.S. Pat. No. 5,012,176, utilizes a mathematical model providing a relationship between charge acceptance and state of charge. Detection of the heat emanating from the battery during charging and the current entering the battery are used to calculate the state of charge which in turn, is used to terminate the battery charging process in order to avoid energy waste once a maximum state of charge is calculated.

As is also known, the power accepted by a rechargeable battery is equal to the input power multiplied by the charge acceptance. That portion of the input power that is not accepted is dissipated as heat. Due to the relatively high thermal resistance of batteries, generally, the input charging current supplied to a battery must be limited in order to prevent an over-temperature condition.

Another reason for limiting the input charging current is the inverse relationship between battery temperature and charge acceptance which generally dominates the battery behavior (i.e., unless the battery is charged so slowly that the thermal rise is minimal and can be ignored). That is, as the battery temperature rises, the charge acceptance is degraded, often resulting in an incapability of the battery to reach its fully charged state. For this reason, the battery temperature is sometimes measured and used to trigger a reduction in the charging current.

Regardless of the reason for limiting the input charging current to a battery, the result is that the battery takes an undesirably long time to charge. For example, it may be necessary to reduce the charging current from a level consistent with a 4C charging rate (i.e., by which the battery would be fully charged in fifteen minutes assuming 100% charge acceptance) to a C/10 rate (i.e., by which the battery would be fully charged in ten hours assuming 100% charge acceptance) in order to ensure that the steady state battery temperature rise does not exceed 8°–10° C.

Battery charging is often characterized as occurring in three phases, including an initial charging phase during which the charge acceptance is relatively high, an intermediate charging phase when the charge acceptance decreases, and a final charging phase during which the charge acceptance approaches zero percent and the battery has reached its full charge state. One type of conventional battery charger circuit decreases the level of input current supplied to a battery at the transition between such phases based on battery voltage. However, even with careful selection of the input current, this technique can only provide optimum charging (i.e., the fastest charging rate consistent with safe battery temperature) during a portion of each charging phase. This is because the charge acceptance varies continuously during a battery charging cycle, even within a particular phase. Thus, a constant level of input current, no matter how carefully selected, will not be optimum throughout an entire charging phase.

SUMMARY OF THE INVENTION

In accordance with the invention, a battery charger circuit adaptively adjusts the level of current supplied to a battery under charge in accordance with the battery charge acceptance. Initial, intermediate, and final charging phases of a charging cycle correspond to one or more states of operation of a state machine. Transitions between the states of operation are controlled by the occurrence of one of multiple conditions which are derived from a model of a battery under charge. With this arrangement, the charging current is continuously adjusted to provide the maximum current that the battery can safely accept.

The battery model interrelates the parameters of charge acceptance, battery temperature, and cumulative supplied charge so that knowledge of the charge rate, the time under charge, and the battery temperature provides an accurate estimate of the charge acceptance. Based on the model, conditions are derived, the occurrence of which causes an adjustment in the state of operation and/or the level of the charging current to ensure that the charging current corresponds to the maximum charge rate that the battery can safely accept. Moreover, the charging algorithm adaptively responds to environmental and initial charge state variations. That is, since the maximum safe charging current varies as a function of the battery temperature and initial state of charge, so too does the current supplied to the battery in accordance with the present invention.

The charging algorithm is implemented by a state machine having six states, one of which is an idle state which occurs either when the charger is powered, in response to a reset command, or potentially at other times during the charge cycle in response to battery condition measurements indicating that the battery is unsuitable for further charging. During a pre-charge state, it is determined whether the battery is within limits deemed to be safe for receiving a high charging current. Normally, the pre-charge state is followed by a high current charging state corresponding to the initial charging phase when the charge acceptance is relatively high. Once the cumulative input charge to the battery under charge has reached approximately 90% of its rated storage capacity (usually expressed in terms of ampere-hours or milliampere-hours), a high temperature state is entered, corresponding to a first portion of the intermediate charging phase, during which the battery temperature is maintained at approximately 40° C. Thereafter, a low temperature state is entered, corresponding to the second portion of the intermediate charging phase, during which the battery temperature is maintained at approximately 33.5° C. Finally, the battery enters a maintenance state where it remains indefinitely maintained in a full charge state.

BRIEF DESCRIPTION OF THE DRAWINGS

The foregoing features of this invention, as well as the invention itself, may be more fully understood from the following detailed description of the invention in which.

DESCRIPTION OF THE PREFERRED EMBODIMENT

Figure 1:
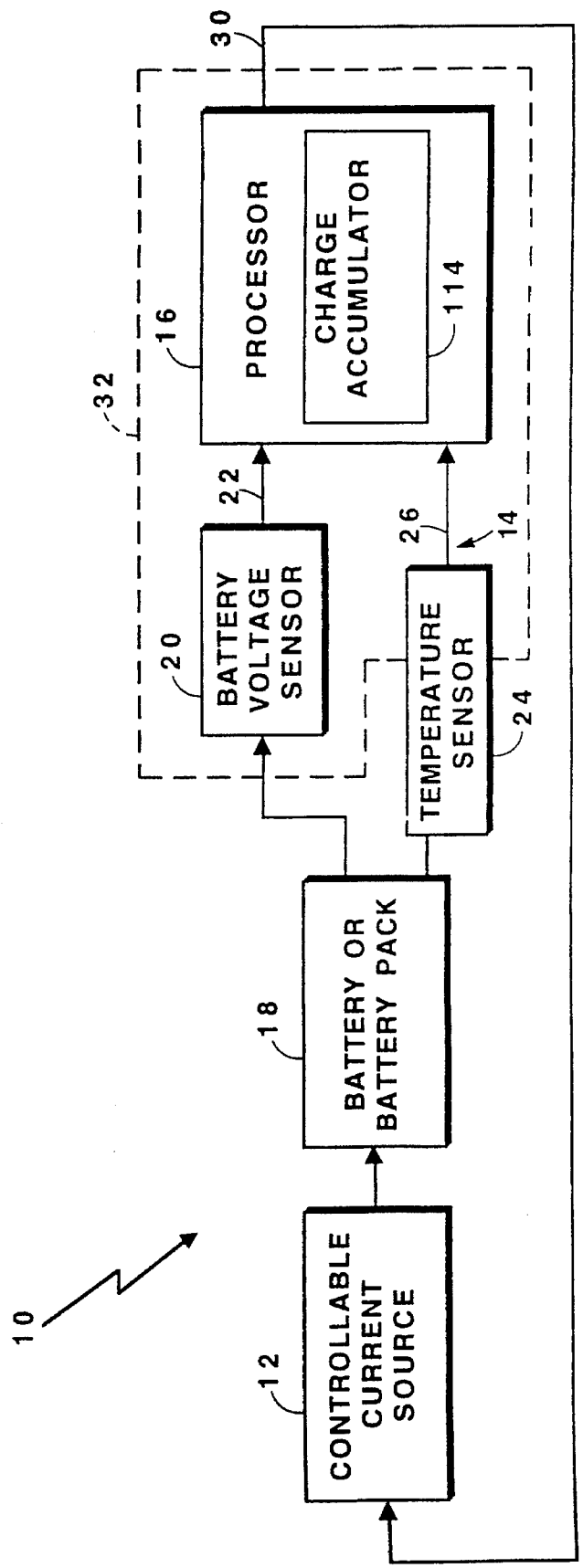
FIG. 1 is a block diagram of a battery charger circuit in accordance with the invention.

Referring now to FIG. 1, a block diagram of a battery charger circuit 32, responsive to a battery voltage sensor 20 and a portion of a battery temperature sensor 24 (sensors 20, 24 being referred to more generally as battery condition sensors 14), includes a processor 16 responsive to the battery condition sensors 14. Circuit 32 is adapted for coupling to a controllable current source 12 and a re-chargeable battery (alternatively referred to as a secondary cell), or battery pack 18 comprising a plurality of individual secondary cells. Exemplary secondary cells are Nickel-Cadmium or Nickel-Metal-Hydride batteries. The controllable current source 12 provides a current to the battery 18 under charge, the average level of which is adjusted in response to a feedback signal 30 provided by processor 16. The sensors 14 include a voltage sensor 20 for providing a battery voltage signal 22 indicative of the magnitude of the voltage across the battery 18 and a temperature sensor 24 for providing a battery temperature signal 26. The feedback signal 30 is derived by the processor 16 in response to the battery temperature signal 26, the battery voltage signal 22, and the state of a charge accumulator 114, which provides a measure of the total current supplied to the battery.

A battery charging cycle includes three phases: (1) an initial charging phase during which the charge acceptance is relatively high so that the battery can readily accept a high level of current; (2) an intermediate charging phase during which the charge acceptance decreases and the battery temperature rises, thereby limiting the amount of charging current that can be accepted; and (3) a final charging phase during which the charge acceptance approaches zero and the battery has reached approximately full charge. Processor 16 includes a state machine 100 (FIG. 3A) and each of the charging phases corresponds to one or more states of operation. The average current supplied by source 12 is adjusted as a function of the state of the state machine. Moreover, the adjustment of the current source 12 is adaptive in the sense that it is a function of, and varies in accordance with, the initial state of charge of the battery 18 as well as environmental conditions affecting the battery temperature. Multiple sets of conditions causing transitions between the states of operation are based on a model of a battery under charge which correlates battery charge acceptance, battery temperature, and cumulative supplied charge. With this arrangement, the value of charging current is adaptively adjusted to continuously provide a maximum achievable product of the charging current and the charge acceptance for the battery while simultaneously preventing the battery from exceeding a safe temperature.

Figure 2:
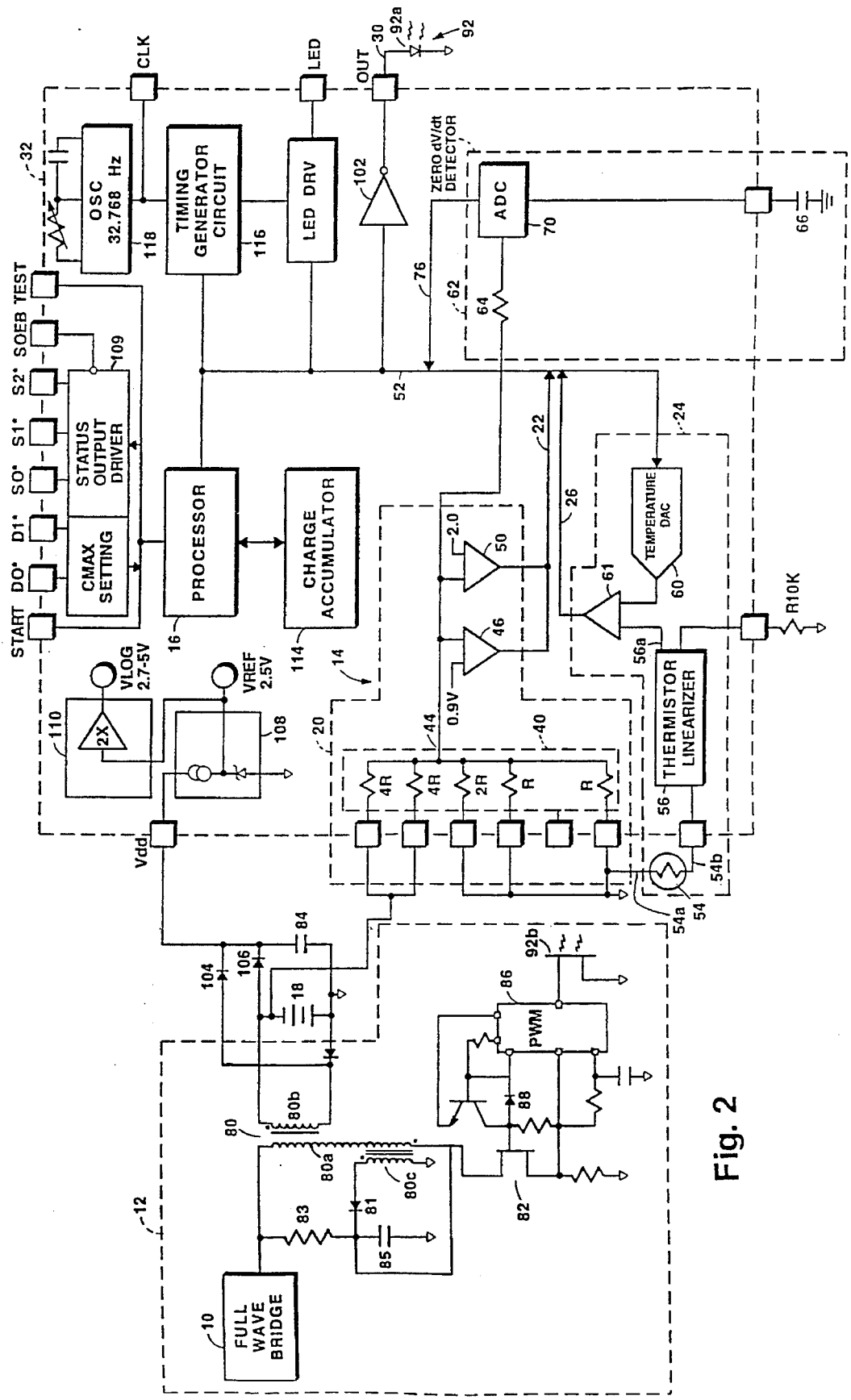
FIG. 2 is a more detailed block diagram of the battery charger circuit of FIG. 1.

Referring to FIG. 2, a block diagram of the battery charger 32 includes battery condition sensors 14 (i.e., including sensors 20, 24) and processor 16. The controllable current source 12 and the battery 18 are external to the circuit 32 which, preferably, is an integrated circuit, or chip. It is understood however, that certain components illustrated as being external to the circuit 32 may alternatively be incorporated therein and components illustrated as being within the circuit 32 may be externally provided.

Processor 16 is responsive to the battery condition sensor output signals (i.e., including signals 22, 26) to trigger transitions between the states of operation and to adjust the charging current within a particular state. The "triggering" between charging states takes place upon the occurrence of one of multiple sets of conditions as described below.

Illustrative current source 12 includes a full wave bridge 10, a transformer 80, and a Pulse Width Modulator (PWM) 86. The full wave bridge 10 is fed by an AC voltage source (not shown) for providing a full wave rectified voltage to the primary winding 80a of transformer 80, the secondary winding 80b of which is coupled to re-chargeable battery 18. Transformer winding 80c, diode 81, resistor 83, and capacitor 85 are arranged to provide power to the PWM 86. A switch 82, such as a FET, is coupled in series with the primary winding 80a and is controlled by PWM 86. With this arrangement, the FET 82 which is switched on and off at a relatively high frequency.

The PWM 86 is controlled by an opto-electronic device 92 having a light emitting diode 92a and a light sensitive transistor 92b. The processor feedback signal 30 activates the light emitting diode 92a and transistor 92b upon the occurrence of certain battery conditions. Activation of the opto-electronic device 92 causes the PWM 86 to be gated off adjusting the average value of the current supplied to the battery 18 via transformer 80. The average current supplied to the battery is equal to the product of the duty cycle of the PWM 86 and the current provided by the current source 12. It is appreciated that the arrangement of the current source 12 and the PWM 86 for controlling such current source is illustrative only and may be modified in accordance with various known circuitry.

The secondary winding 80b of the transformer 80 is further coupled to a pair of diodes 104, 106 which provide a supply voltage Vdd to the charger circuit 32. A reference voltage generator 108 receives the supply voltage Vdd and provides reference voltages for use in circuit 32, such as 2.5 volts. For example, the reference voltages generated by circuit 108 provide threshold voltages for comparators 46, 50, and 61, described below. Also provided is a 2X voltage multiplier 110 for providing a 5.0 volt reference voltage for powering the circuit 32.

The battery 18 is coupled to the voltage sensor 20 in a manner determined by the number of secondary cells comprising the battery pack 18 to be charged. The voltage sensor 20 includes a resistor network 40 having an output terminal 44 and comparators 46, 50. The battery pack 18 is connected to the resistor network 40 such that the voltage at the output terminal 44 is nominally 1.5 volts (i.e., as is characteristic of the voltage of a single cell or multiple cells coupled in parallel), regardless of the number of series coupled cells comprising the battery pack 18. In this way, the single circuit 32 accommodates charging of a plurality of series coupled cells. For example, in the illustrative arrangement of FIG. 2, the battery pack 18 is connected to the resistor network 40 so that ⅙th of the voltage across the battery pack is provided at the output terminal 44, in order to accommodate a battery pack having six individual series coupled cells. Connections to the plurality of resistors of network 40 are accessible by a corresponding plurality of pads, or pins on the chip 32 so that the appropriate resistor divider arrangement for a desired number of cells to be charged can be established.

The output terminal 44 of the resistor network 40 is coupled to first inputs of comparators 46 and 50, second inputs of which receive a corresponding predetermined threshold voltage. More particularly, comparator 46 receives a threshold voltage of 0.9 volts and comparator 50 receives a threshold voltage of 2.0 volts (i.e., such threshold voltages being provided by generator 108). The outputs of comparators 46, 50 are coupled together to provide battery voltage signal 22 to the processor 16 via a bi-directional signal bus 52, as shown. If the voltage at the output terminal 44 of resistor network 40 is less than 0.9 volts, the output of comparator 46 transitions, thereby indicating to the processor 16 that the cell 18 may be damaged, shorted, or otherwise in an unsuitable condition for receiving a high charging current. If the voltage at the output terminal 44 is greater than 2.0 volts, then the output of comparator 50 transitions, thereby indicating to the processor 16 that the cell 18 is not connected properly. If however, the voltage at the output port 44 is between 0.9–2.0 volts, then neither the output of comparator 46 nor the output of comparator 50 transitions, thereby indicating to the processor 60 that the cell 18 is suitable for charging.

The battery temperature sensor 24 includes a thermistor 54, disposed in close proximity to the battery 18, a thermistor linearizer 56, a temperature digital-to-analog converter (DAC) 60, and a comparator 61. Preferably, the thermistor 54 is built into the battery pack 18 or is disposed in contact with the battery 18, in order to ensure the accuracy of the measured battery temperature. The thermistor 54 has a first terminal 54a coupled to ground and a second terminal 54b coupled to the thermistor linearizer 56. Linearizer 56 scales the temperature measured by the thermistor 54 to provide a linear relationship between the measured battery temperature and the voltage at output terminal 56a of linearizer 56. The output 56a of the thermistor linearizer 56 is coupled to a first input of a comparator 61, a second input of which receives an output, threshold voltage from the temperature DAC 60. The DAC 60 provides the threshold voltage in response to a control signal from processor 16 which corresponds to a predetermined temperature to be compared to the measured battery temperature. Thus, the battery temperature signal 26 indicates whether the battery temperature is greater or less than a predetermined temperature corresponding to the threshold voltage provided by the DAC 60. The battery temperature signal 26 is coupled to processor 16 via signal bus 52.

The temperature sensor 24 may include an additional sensor (i.e., in addition to a sensor for measuring the absolute battery temperature) for use in determining the relative temperature, or temperature rise of the battery. The temperature rise of the battery provides an advantageous indication of the heat dissipated in the battery. Thus, where the states of operation of charger 32 transition upon the detection of a predetermined battery temperature as discussed below, such battery temperature may correspond to battery temperature rise. One exemplary benefit of utilizing a battery temperature rise measurement occurs where a battery is placed into a higher than ambient environment. Under such conditions, the optimization of battery charging provided by the circuit 32 will be realized by preventing premature state transitions based on an absolute battery temperature measurement. Note however that even if temperature rise is measured and used to trigger state transitions, an absolute temperature measurement is desirable in order to prevent an over-temperature condition.

An additional battery condition sensor providing a signal 76 to processor 16 is a zero-dV/dt detector 62 which detects the peak of the battery voltage to indicate whether the battery voltage is rising or falling. The zero-dV/dt detector 62 includes a resistor 64, an Analog to Digital Converter (ADC) 70, and a capacitor 66, as described below in conjunction with FIGS. 3A–B.

Circuit 32 includes a plurality of user accessible inputs (i.e., labelled "start", D0*–D1*, "SOEB" and "test") and outputs (i.e., labelled S0*–S2*). The start input is one way to initiate a charging cycle. Another way to initiate a charging cycle is by the processor 16 detecting the insertion of a battery pack 18. The test input enables an external clock to control the charger in order to test the charger 32. When a test clock signal is applied at the test input, the internal timing logic is inhibited. Inputs D0*–D1* are programmed by the user to specify the maximum specified charge rate (i.e., referred to hereinafter as CMAX) for the battery 18 under charge. That is, the user applies appropriate voltage levels at inputs D0*–D1* to specify whether the battery under charge is rated for a 1C, 2C, 4C, or 6C maximum charging rate. This choice of charging current must also correspond to the actual value of current that the current source 12 is programmed to supply. Table 1 shows exemplary programming of inputs D0*–D1* and the corresponding maximum charge rate:

TABLE 1

| D0* | D1* | CMAX |
|---|---|---|
| 0 | 0 | 1 |
| 0 | 1 | 2 |
| 1 | 0 | 4 |
| 1 | 1 | 6 |

The programmed value of CMAX, in conjunction with the state of operation of the charger 32, determines the duty cycle of the PWM 86, as described below. User accessible circuit outputs S0*–S2* are provided by a status output driver 109 and enabled by the SOEB input signal to indicate of the current state of operation of the state machine 100.

Status output signals S0*–S2* may be coupled to LEDs (not shown) for visual indication or to a microprocessor (not shown) for monitoring the charging of the battery 18.

Figure 3A:
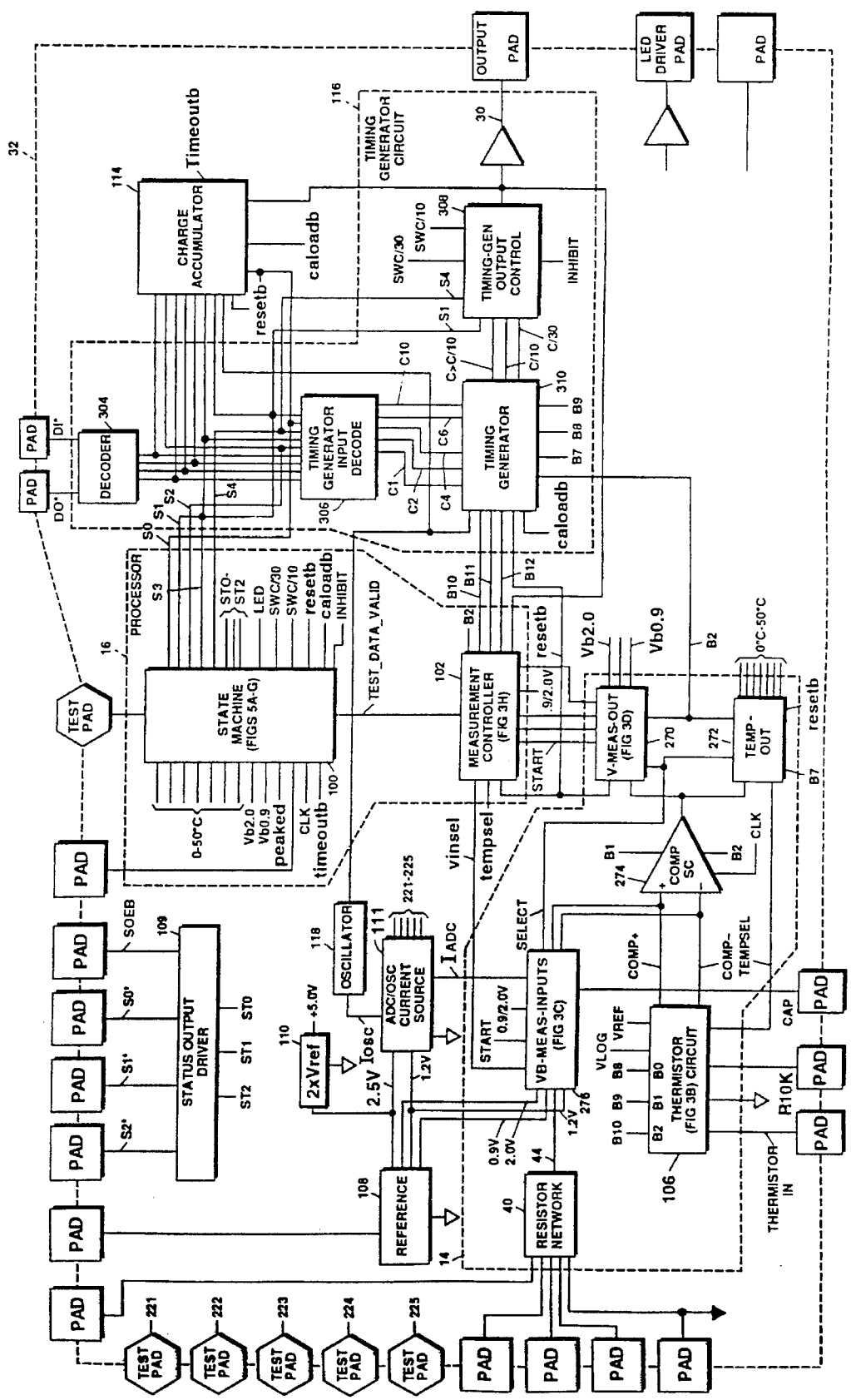
FIG. 3A is a schematic diagram of the battery charger circuit of FIG. 2.
Figure 3B:
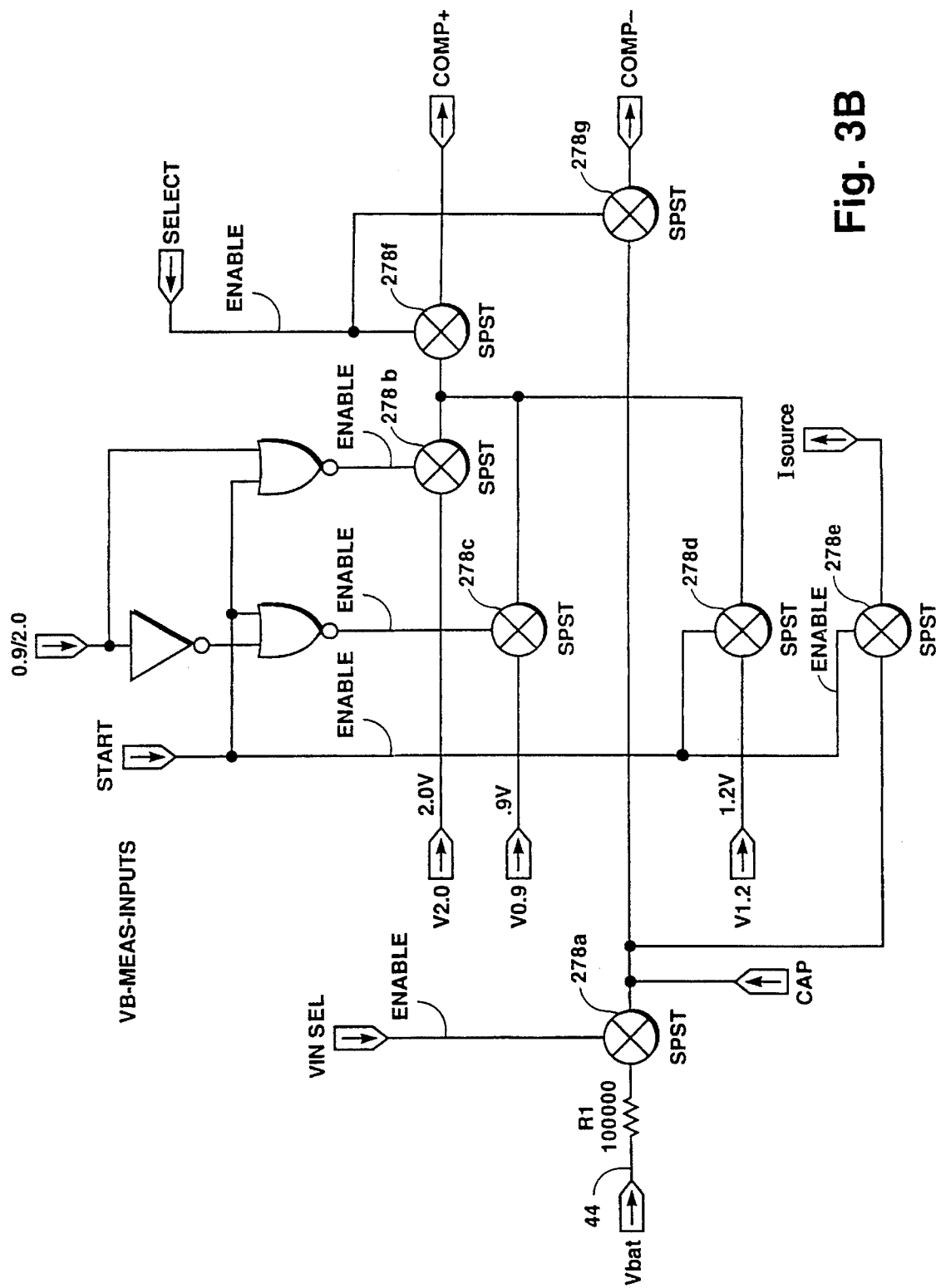
FIG. 3B is a schematic diagram of the VB-measurement-inputs circuit of FIG. 3A.
Figure 3C:
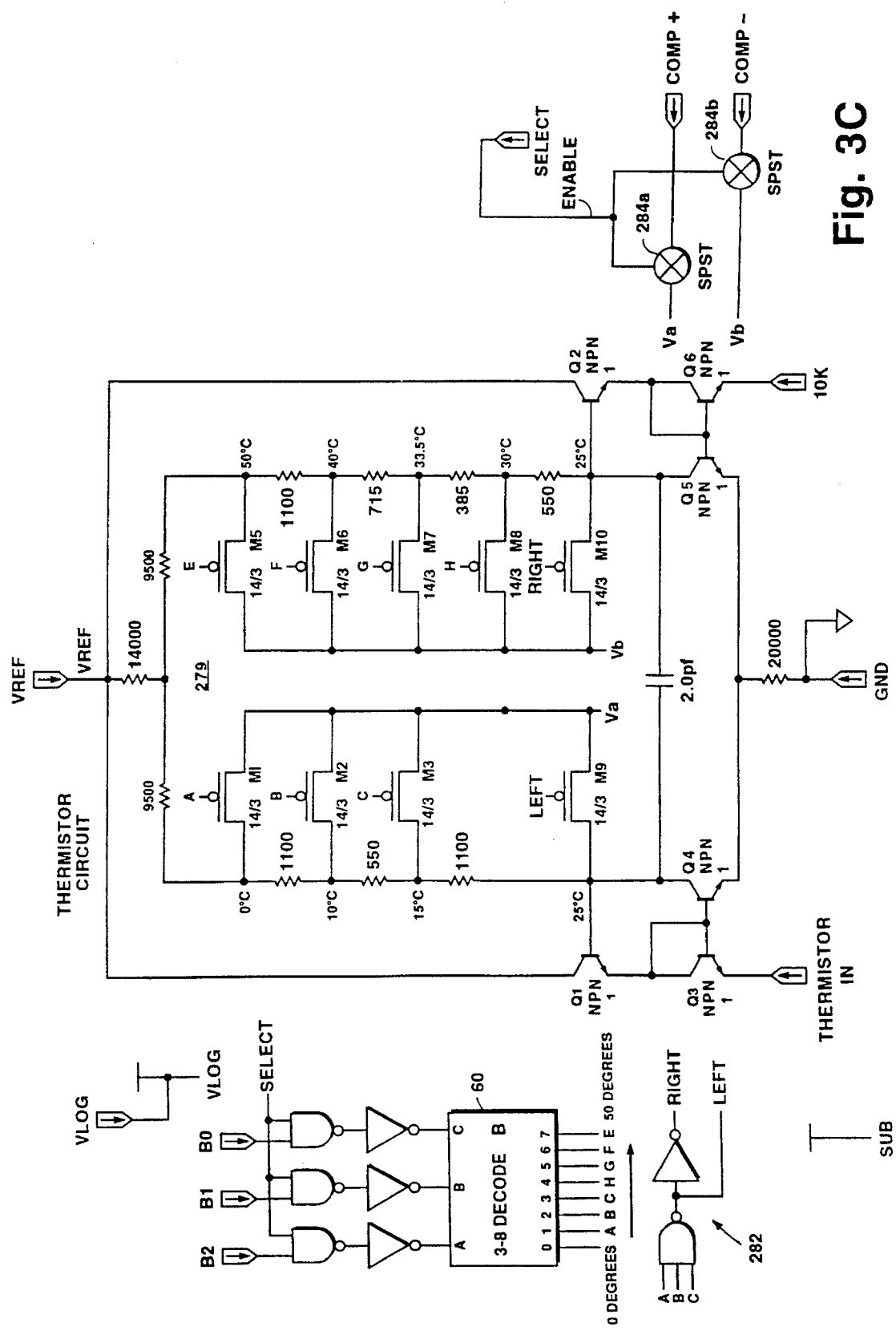
FIG. 3C is a schematic diagram of the thermistor linearizer circuit of FIG. 3A.
Figure 3D:
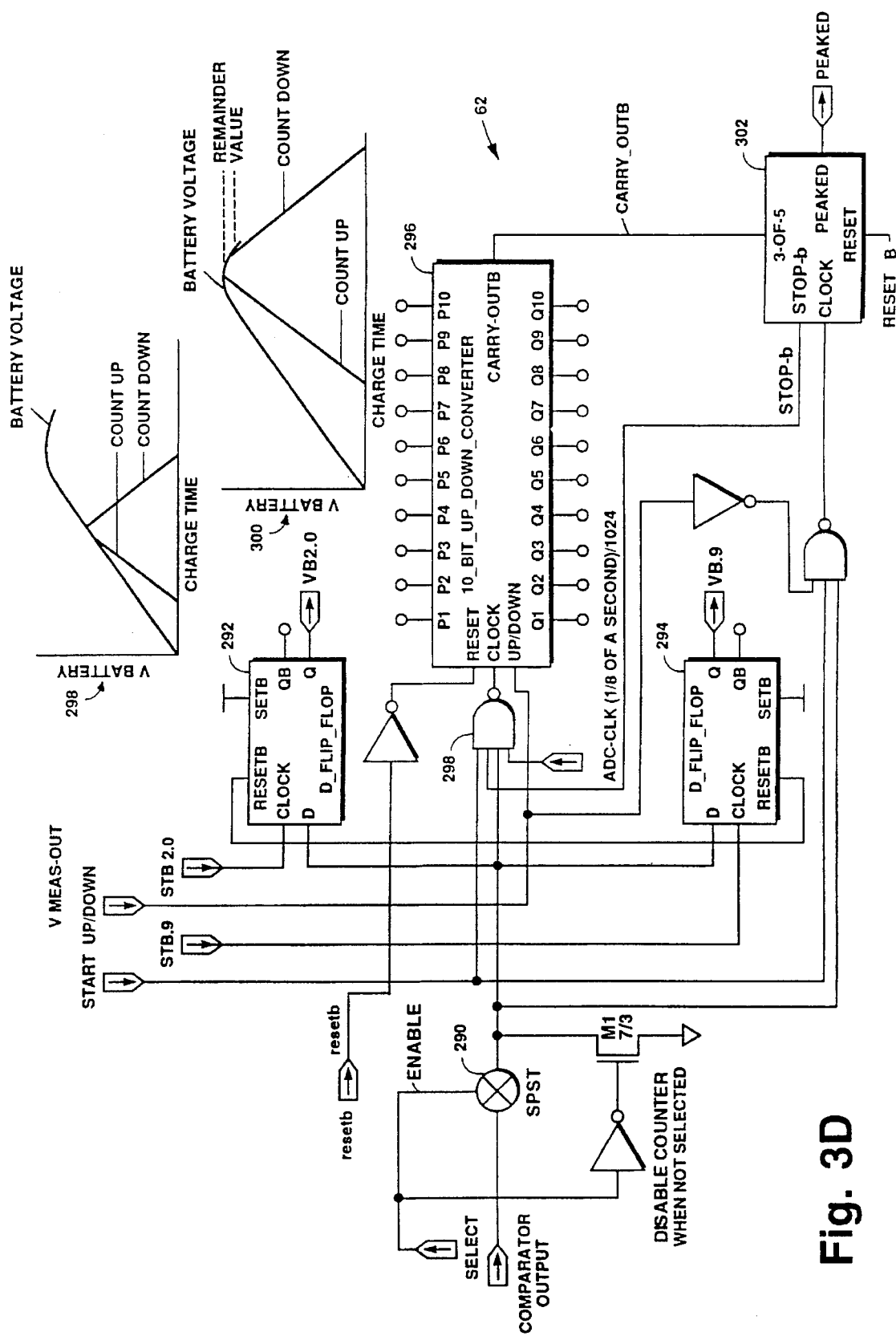
FIG. 3D is a schematic diagram of the VB-measurement-output circuit of FIG. 3A, with included theory of operation diagrams.
Figure 3E:
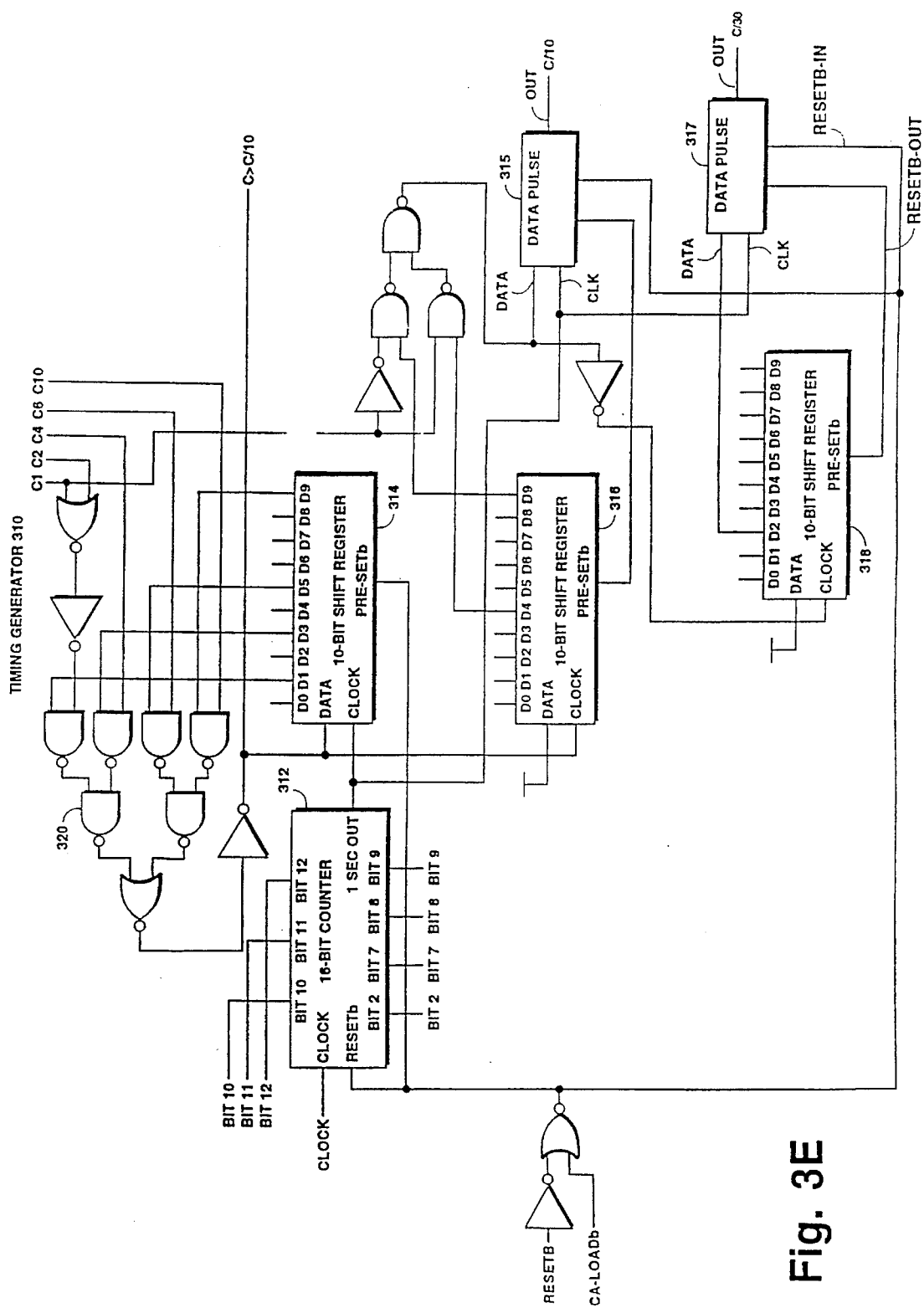
FIG. 3E is a schematic diagram of the timing generator of FIG. 3A.
Figure 3F:
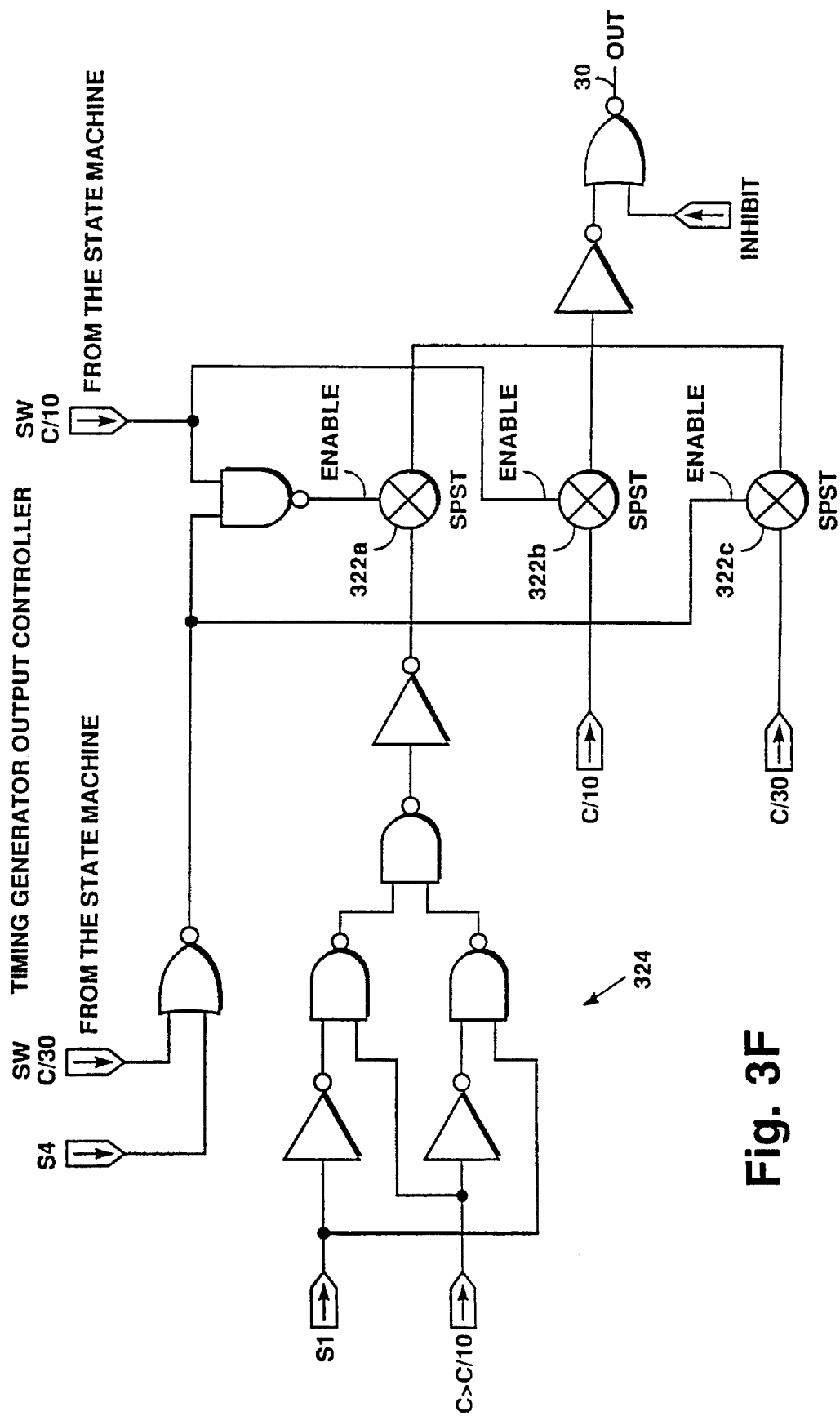
FIG. 3F is a schematic diagram of the timing generator output controller of FIG. 3A.
Figure 3G:
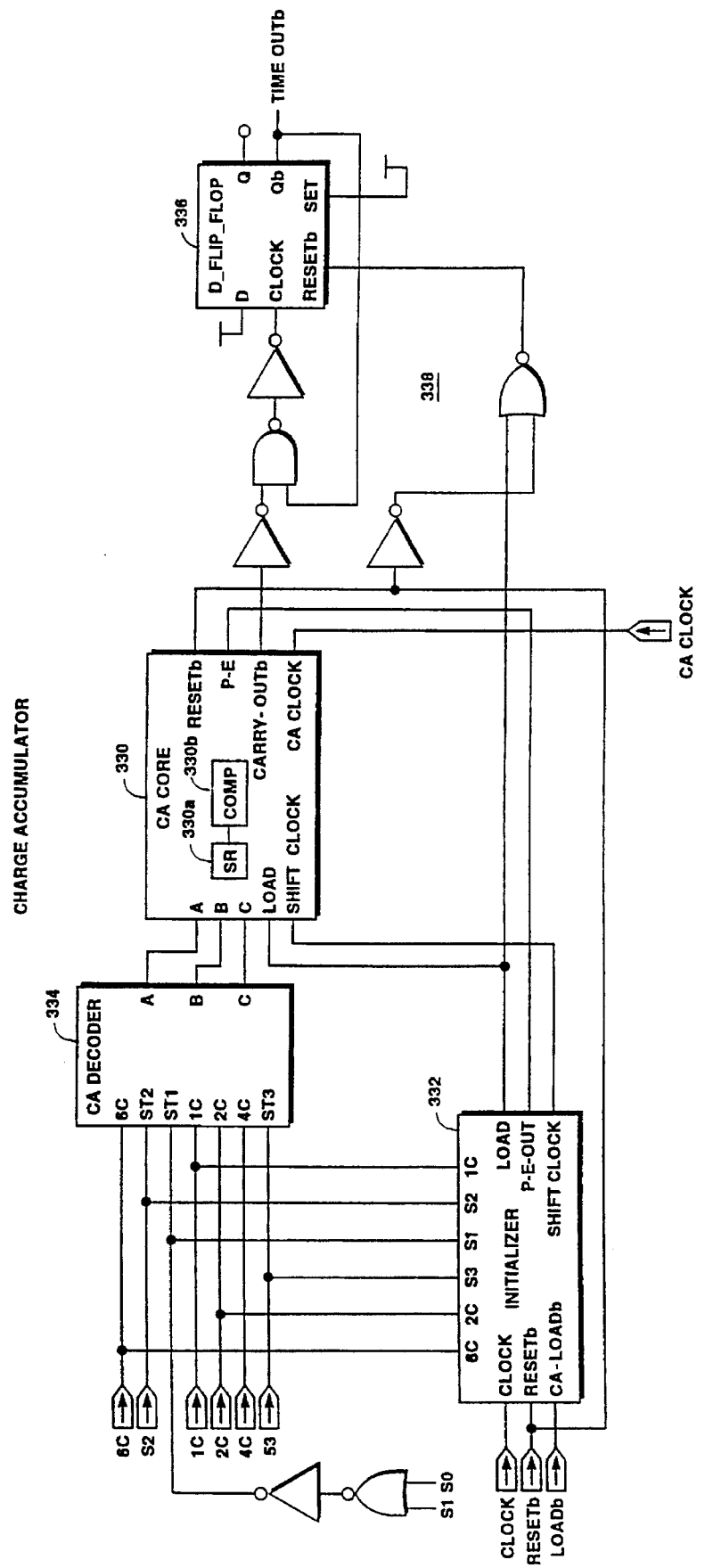
FIG. 3G is a schematic diagram of the charge accumulator of FIG. 3A.

Charge accumulator 114 includes a shift register and a counter (FIG. 3G). The counter counts down from a predetermined value corresponding to a predetermined cumulative charge to be supplied to the battery 18. Specifically, the charge accumulator 114 decrements the count by one every time the output of the PWM 86 transitions so that when a zero count value is reached, an indication is provided that all of the charging intended for a particular state of operation has been accomplished. An oscillator 118 provides a 32.768 Hz primary clock signal. A timing generator circuit 116 generates a plurality of secondary clock signals having frequencies related to that of the primary clock signal for use in timing the battery condition measurements by sensors 14, as will be described in conjunction with FIGS. 3E–F.

Referring to FIG. 3A, a schematic diagram of the battery charging circuit 32 is shown to include processor 16, timing generator circuit 116, battery condition sensors 14, oscillator 118, charge accumulator 114, reference voltage generator 108, 2X voltage multiplier 110, status output driver 109, and an ADC/OSC current source 111. The current source 111 receives a 1.2 volt reference voltage from generator 108 and includes two trimmable current sources; one providing a current (i.e., $I_{ADC}$) for discharging capacitor 66 of the zero-dV/dt circuit 62 and the other providing a current (i.e., $I_{OSC}$) for the oscillator circuit 118. A plurality of test pins ZZ1–ZZ5 are accessible from corresponding test pads for trimming the $I_{ADC}$ and the $I_{OSC}$ current sources.

Referring to the battery condition sensors 14, a single comparator 274 provides the functionality of the individual comparators 46, 50, and 61 described above. More particularly, the inputs to comparator 274 are selectively coupled to either a VB-measurement-inputs circuit 276 or a thermistor circuit 106. The VB-measurement-inputs circuit 276, as shown in FIG. 3B, includes a plurality of single pole single throw switches 278a–g and receives the battery voltage from the output terminal 44 of the resistor network 40, a 2.0 volt reference, a 0.9 volt reference, and a 1.2 volt reference from reference generator 108. Upon enablement of switches 278a and 278g by a vinsel signal and a select signal (provided by a measurement controller 102), respectively, the battery voltage is coupled to the comparator 274 (i.e., at the COMP- pin). Upon enablement of one of switches 278b–f, a selected one of the reference voltages is coupled to the comparator 274 (i.e., at the COMP+pin). The selective enablement of switches 278b–f is controlled by the user actuated start signal, a 0.9/2.0 signal provided by measurement controller 102, and the select signal provided by measurement controller 102. The comparison of the 1.2 volt reference voltage to the battery voltage is used in conjunction with the zero-dV/dt detector 62, as will be described.

The inputs of comparator 274 are further coupled to the thermistor circuit 106 (which includes the thermistor linearizer 56 and the temperature DAC 60 of FIG. 2). Referring to FIG. 3C, the thermistor circuit 106 is shown to include a resistor/transistor ladder network 279, the transistors of which receive signals A–E generated by decoder, or DAC 60. Decoder 60 decodes bits B0–B2 from the timing generator circuit 116, discussed below, to provide signals A–E, each one corresponding to a temperature between 0°– 50° C. More particularly, bits B0–B2 of thermistor circuit 106 correspond to bits B8–B10 generated by the timing generator circuit 116 and represent a predetermined temperature value to be compared to the thermistor measured battery temperature. Each of the signals A–E controls a corresponding one of the ladder transistors M1–M3 and M5–M8 and additional "right" and "left" signals, provided by a logic circuit 282 in response to signals A–C, control ladder transistors M9, M10, as shown. The thermistorin signal, provided at terminal 54b of the thermistor 54 (FIG. 2), and an external precision 10 Kohm resistor, are coupled to the resistor ladder 279, as shown. The resistor ladder 279 provides output signals Va, Vb which are selectively coupled, in response to the select signal, to the inputs of comparator 274 via switches 284a–b.

With this arrangement, when the temperature of the battery 18 is approximately 25° C., the ladder 279 is "balanced" such that the output voltages Va and Vb are equal. Otherwise the voltages Va, Vb differ such that the output of the comparator 274 transitions when the battery temperature is greater than the predetermined temperature represented by bits B0–B2. To this end, the each of the junctions between the resistors of ladder 279 corresponds to a predetermined temperature value, as indicated.

From the above discussion, it is apparent that the battery temperature signal 26 and the battery voltage signal 22 (FIG. 2) are actually both provided at the output of the same comparator 274, albeit at different times. That is, the enabling signals coupled to the switches 278a–g and 284a–b control the coupling of signals to the comparator inputs in accordance with whether the battery voltage or the battery temperature is to be measured.

The output of the comparator 274 is coupled to a temperature-output circuit 272 and a V-measurement-output circuit 270. The temperature-output circuit 272 includes a shift register which receives the comparator output signal and provides a plurality of battery temperature output signals (labelled 0° C.–50° C.) to the state machine 100. More particularly, the shift register is clocked by bit B2 generated by the timing generator circuit 116 which has a frequency related to that of the primary clock signal. The register is shifted to provide the comparator output transition information at the appropriate one of output signals 0°–50° C. In this way, each of the signals 0° C.–50° C. indicates whether the battery temperature has exceeded the corresponding temperature. Note that the comparator output is coupled to the temperature-output shift register 272 when the thermistor circuit 106 is coupled to the comparator inputs.

Referring to FIG. 3D, the V-measurement-output circuit 270 as shown in FIG. 3A is selectively coupled to the output of the comparator 274 by the select signal and switch 290 when the VB-measurement-inputs circuit 276 is coupled to the comparator inputs. Circuit 270 provides a peaked signal, indicating whether a peak of the battery voltage has been detected, and the Vb2.0 and Vb0.9 signals, indicating whether the battery voltage is above or below 2.0 and 0.9 volts, respectively, to the state machine 100. More particularly, flip-flops 292, 294 receive strobe signals STB2.0 and STB0.9, respectively, from the measurement controller 102 (FIG. 3H) which ensure that the comparator output signal is latched at the appropriate voltage measurement times (i.e., when the supply of current to the battery 18 is interrupted, as described below).

The battery voltage peak, or zero-dV/dt detector 62 (FIG. 2) is implemented with ten bit up/down counter 296. All battery measurements, including temperature and peak voltage, are made at intervals during which the charging is interrupted. However, whereas the battery temperature and voltage measurements are made at such charge interruption intervals throughout the entire charging cycle, the peak measurement is made at such charge interruption intervals only during a high current charging state and specifically, during one second intervals when the charging current is interrupted. The counter 296 is incremented and decremented at a clock rate determined by bit 2 from the timing generator 116 (labelled ADC-clk in FIG. 3D) and the comparator output. An up/down control signal generated by the measurement controller 102 determines the direction of the count. During the up count, the external capacitor 66 (FIG. 2) coupled to the cap pin of the VB-measurement-inputs circuit 276 (FIG. 3C) is charged by the battery. During the down count, capacitor 66 is discharged through the $I_{ADC}$ current source of circuit 111. As long as the battery voltage is increasing, as shown in the insert 298 to FIG. 3D, the counter will count down to the point where the carry bit transitions, thereby indicating that a voltage peak has not been detected. The point to which the counter counts down and the carry bit transitions corresponds to a battery voltage of 1.2 volts. Thus, when the peak voltage is being measured, the 1.2 volt reference is compared to the battery voltage so that once the battery voltage falls to 1.2 volts, NAND gate 298 stops the counter clock. Once the battery voltage starts to decrease, as shown in the insert 300 to FIG. 3D the counter 296 will count down a smaller amount than is counted up, leaving a remainder in the counter register. Thus, when a peak has been reached, the carry bit will not transition, thereby indicating the detection of a voltage peak.

The carry bit of counter 296 is coupled to a 3-of-5 shift register 302 which shifts the carry bit at the instants of the down counts of counter 296. The shift register 302 causes the peaked output signal to transition once three of five consecutive carry bits indicate the detection of a battery voltage peak.

Turning to the timing generator circuit 116 of FIG. 3A, it is noted that the generator circuit 116 provides the clock signals for controlling the timing of operations of the circuit 32, such as when the battery conditions are measured, as well as for establishing a plurality of duty cycles at which the PWM 86 is operated. Timing generator circuit 116 includes a decoder 304, a timing generator input decoder 306, a timing generator 310 (FIG. 3E), and a timing generator output controller 308 (FIG. 3F).

Decoder 304 decodes the user programmed inputs D0* and D1* to provide a four bit representation of the corresponding maximum charge rate to the timing generator input decoder 306, as shown. Decoder 306 additionally receives state machine outputs S1–S3 indicating the current state of operation and decodes this information to provide signals C1, C2, C4, C6, and C10 to the timing generator 310.

Referring now to FIG. 3E, the timing generator 310 is shown to include a 16-bit counter 312 and three 10-bit shift registers 314, 316, and 318. Counter 312 receives the 32.767 Hz primary clock signal and provides count bits B2, B7, B8, B9, B10, B11, and B12 having frequencies which are fractional multiples of the primary clock signal for use in controlling the timing of the charger operations. Counter 312 also provides a one second clock signal output coupled to shift register 314.

Shift registers 314, 316, in conjunction with data pulse generators 315, 317, provide duty cycle output signals C>C/10, C/10, and C/30 to the timing generator output controller 308 (FIG. 3F). More particularly, a logic circuit 320 receives the signals C2–C10 from the timing generator input decoder 306 and is coupled to the shift register 314 so that one of the shift register outputs D0–D9 will be fed back through the logic circuit 320 to the data input of shift register 314 and the clock inputs of registers 316, 318.

Referring now to FIG. 3F, the timing generator output controller 308 receives the duty cycle signals C>C/10, C/10, and C/30 from the timing generator 310 and provides the feedback signal 30 (FIGS. 1, 2, and 3A) to control the PWM 86 and thus, also to control the current provided by source 12. Controller 308 includes switches 322a–c for selectively coupling one of the duty cycle signals to the opto-electronic device 92 (FIG. 2) in accordance with state machine output signals SWC/10, SWC/30, and S4, as shown. The duty cycle signal C>C/10 is processed by logic circuit 324 and state machine status output signal S1 to ensure that during the high current state (FIG. 5C) the battery is charged for nine seconds and interrupted for one second, as described below.

Referring now to FIGS. 3A and 3G, recall that charge accumulator 114 includes a shift register 330a and a counter 330b which counts down from a predetermined set value corresponding to a predetermined cumulative charge to be supplied to the battery 18 in a given state. Specifically, the charge accumulator 114 decrements the counter by one every time the output of the PWM 86 transitions so that when a zero count value is reached, a timeoutb signal indicates that the charging current intended for a particular state of operation has been supplied. Charge accumulator 114 includes a decoder 334, an initializer circuit 332, a CA-core circuit 330 (including the shift register 330a and counter 330b), and a flip-flop 336. The initializer circuit 332 receives the primary clock signal and a caloadb signal from the state machine 100 and provides a shift-clock signal to shift register 330a.

The value to which the charge accumulator 114 is set (i.e., that value from which the count down starts) is determined by the following equation:

$$CA \text{setting} = \frac{60 \cdot \frac{(\% \text{ of Charge Desired})}{100}}{\text{Effective Charge Rate}} \cdot \text{Charge cycles/minute} \quad (1)$$

For example, consider a battery having a 6C maximum charge rate as programmed at inputs D0*–D1* (i.e., CMAX=6C) being charged by charger 32 with the state machine 100 in state 2. As will be described below, during state 1, the battery 18 is charged to 90% of its rated input current, or 0.9·CIN. The clock rate for a 6C charge rate is 10 clock cycles/minute. Thus, the effective charge rate is ⅙ CMAX, or specifically, since CMAX is 6C, the effective charge rate is one. By the above equation then, the charge accumulator 114 is set to (((60×90)/100)/1)×10, or 540.

Charge accumulator 114 receives the four bit representation of the maximum charge rate programmed by the user and decoded by decoder 304. Also received are state machine output signals S0–S3 indicating the current state of the state machine 100. The charge accumulator decoder 334 decodes these input signals to provide a transition on one of the three signals lines A–C which are provided to the shift register 330a of the CA-core circuit 330.

The charge accumulator is programmed by providing signals A, B, and C to the shift register 330a and shifting the register between 0 and 4 places to provide the input to the counter 330b. With this arrangement, the three input signals A–C are resolved to correspond to one of ten charge accumulator settings in accordance with the shift-clock signal provided by the initializer 332 indicating the shift. Table 2 correlates CMAX rates with charge accumulator settings and the amount by which the shift register 330a must be shifted for states 1–3 of the state machine 100.

TABLE 2

| CMAX | State 1 starting setting/ shift | State 2 starting setting/ shift | State 3 starting setting shift |
|---|---|---|---|
| 6C | A/0 | B/1 | A/2 |
| 4C | B/0 | C/0 | B/2 |
| 2C | B/1 | C/1 | B/3 |
| 1C | B/2 | C/2 | B/4 |

Table 3 is a truth table indicating the decoding provided by decoder 334 and the shifting of shift register 330a to provide the various charge accumulator settings for states 1–3 of the state machine 100:

TABLE 3

| CA setting | Shift Register Input/shift count | 1C | 2C | 4C | 6C | ST1 | ST2 | ST3 |
|---|---|---|---|---|---|---|---|---|
| 60 | A/0 | 0 | 0 | 0 | 1 | 1 | 0 | 0 |
| 90 | B/0 | 0 | 0 | 1 | 0 | 1 | 0 | 0 |
| 180 | B/1 | 0 | 1 | 0 | 0 | 1 | 0 | 0 |
| 180 | B/1 | 0 | 0 | 0 | 1 | 0 | 0 | 1 |
| 240 | A/2 | 0 | 0 | 0 | 1 | 0 | 1 | 0 |
| 270 | C/0 | 0 | 0 | 1 | 0 | 0 | 0 | 1 |
| 360 | B/2 | 1 | 0 | 0 | 0 | 1 | 0 | 0 |
| 360 | B/2 | 0 | 0 | 1 | 0 | 0 | 1 | 0 |
| 540 | C/1 | 0 | 1 | 0 | 0 | 0 | 0 | 1 |
| 720 | B/3 | 0 | 1 | 0 | 0 | 0 | 1 | 0 |
| 1080 | C/2 | 1 | 0 | 0 | 0 | 0 | 0 | 1 |
| 1440 | B/4 | 1 | 0 | 0 | 0 | 0 | 1 | 0 |

The carry output of the counter 330b is clocked into a flip-flop 336 via logic 338 to provide the timeoutb signal indicating that the charge accumulator has counted from the set value to zero.

Figure 3H:
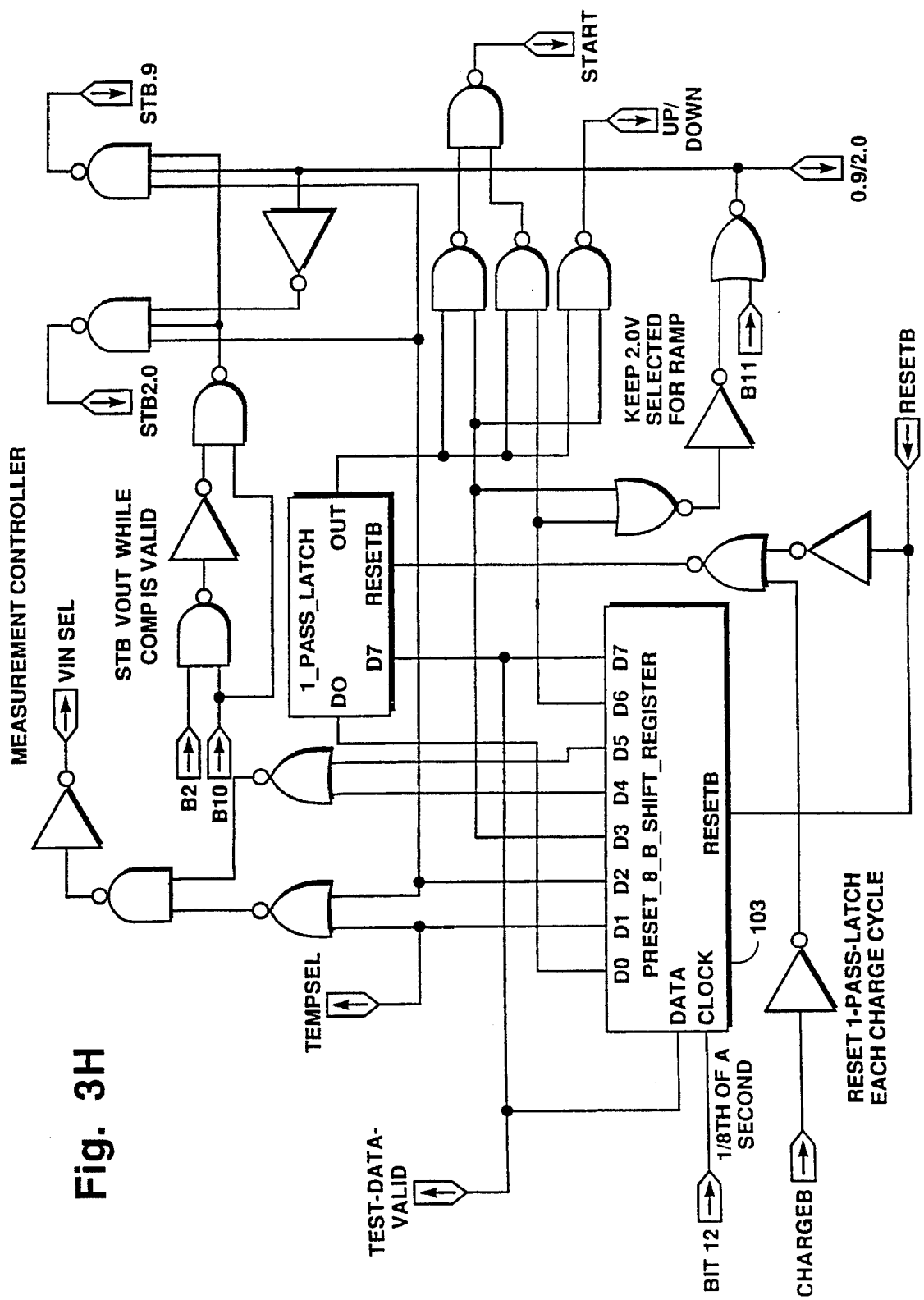
FIG. 3H is a schematic diagram of the measurement controller of FIG. 3A.

Referring to FIG. 3A, processor 16 includes state machine 100 and the measurement controller 102. The measurement controller 102 is shown in FIG. 3H to include a shift register 103 receiving bit 12 from the timing generator circuit 116 (i.e., a clock signal of ⅛ second) and providing control bits D0–D7 for controlling the timing of the battery voltage, battery temperature, and zero-dV/dt measurements. The following functions occur at ⅛ second intervals: (1) no function; (2) battery temperature measurement and charge capacitor 66 (FIG. 2); (3) battery voltage measurement and charge capacitor 66; (4) a down count of the zero-dV/dt detector counter 296 (FIG. 3D); (5) charge capacitor 66; (6) charge the capacitor 66; (7) an up count of the zero-dV/dt detector counter; and (8) feedback shift register bit of measurement controller shift register 103.

Specifically, controller 102 provides a tempsel signal to couple the thermistor circuit 106 and the temperature-output circuit 272 to the comparator 274 to initiate a battery temperature measurement and a vinsel signal to couple the VB-measurement-inputs circuit 276 to the comparator 274 to initiate a battery voltage measurement. Strobe signals STB2.0 and STB0.9 and control signal 0.9/2.0 are provided to the V-measurement-output circuit 270 (FIG. 3D) as described above. Also generated by the measurement controller 102 is the Up/Down input to the zero-dV/dt detector counter 296 (FIG. 3D). A test-data-valid signal is provided to the finite state machine 100 to indicate that the battery condition signals (i.e., signals 0°–50° C., Vb2.0, Vb0.9, and peaked) are valid.

In addition to the battery condition measurement signals, state machine 100 receives the primary clock signal and the charge accumulator generated timeoutb signal. State machine 100 generates status output signals S0–S4, corresponding to the current state of the machine, and output signals ST0–ST2 providing a three bit representation of the current state of machine 100. An LED output signal may be coupled to a driver and LED to indicate that a battery charge cycle has been initiated. Output signals SWC/30 and SWC/10 are coupled to the timing generator output controller 308 for controlling which one of the duty cycle signals C>C/10, C/10, or C/30 is coupled to the circuit output 30. An inhibit signal is also provided by the state machine 100 to the timing generator output controller 308 to inhibit the output signal 30 if the battery temperature has exceeded a predetermined value. This inhibit operation occurs during the temperature serving states 2 and 3 (FIGS. 5D–E) and interrupts the charge current to enable the battery temperature to fall to the predetermined value. The caloadb signal is provided by state machine 100 to the charge accumulator 114 and the reset signal is provided to reset various components of circuit 32 upon power up.

Figure 4A:
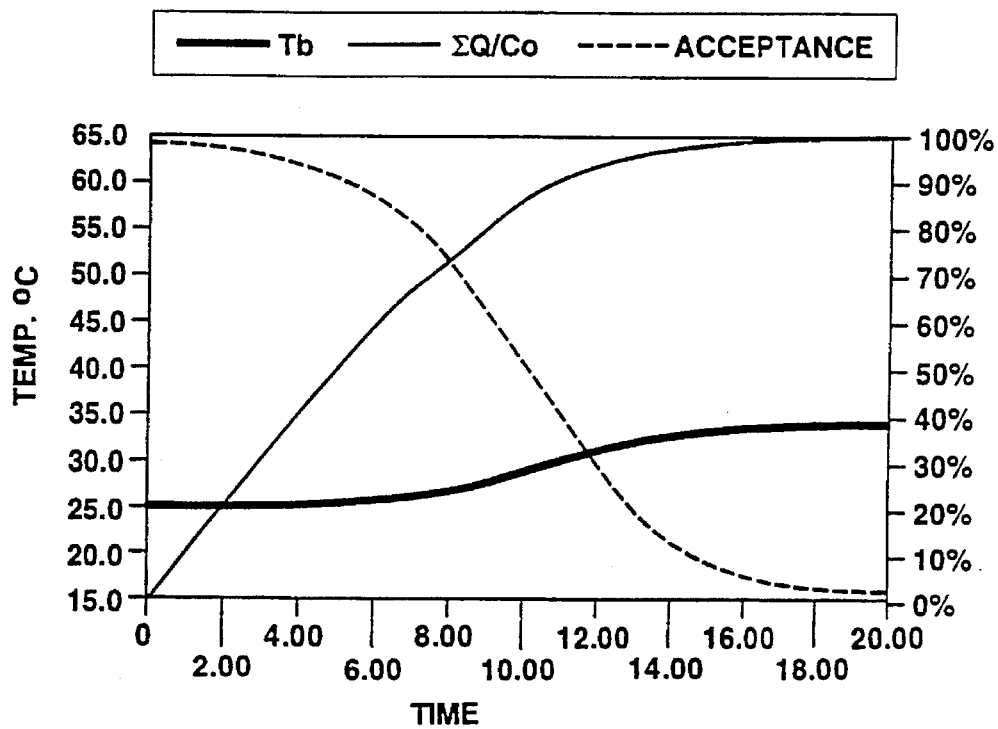
FIGS. 4A–4C are graphical representations of three separate exemplary charging conditions, each including representations of charge acceptance, battery temperature, and cumulative supplied charge parameters of exemplary batteries under charge in accordance with a model used in conjunction with the battery charger circuit of FIG. 2.
Figure 4B:
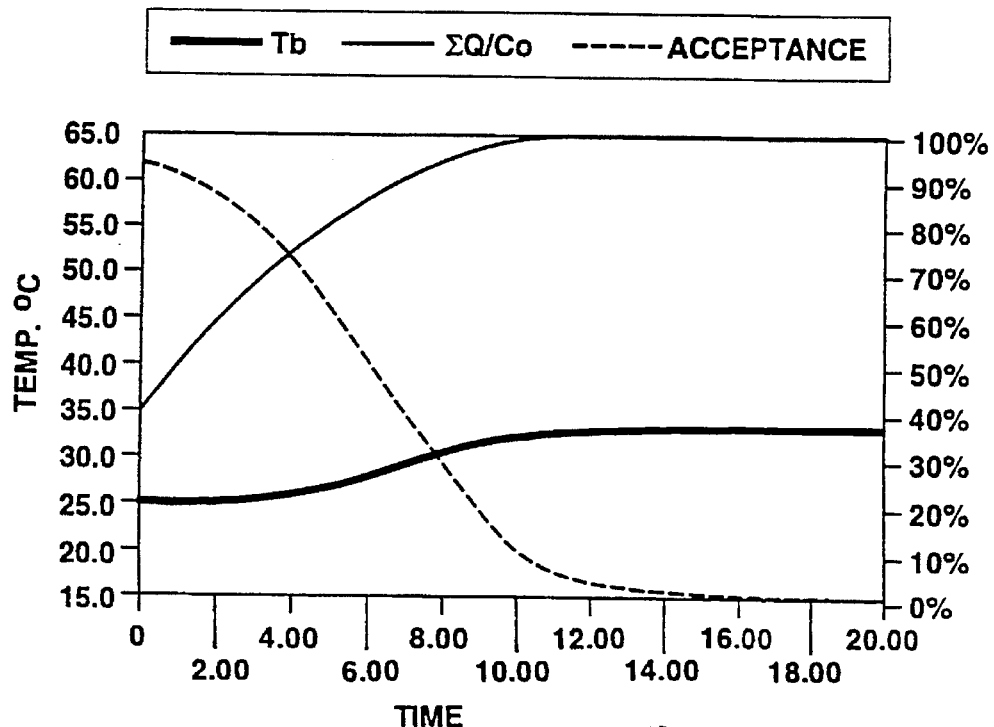
Figure 4C:
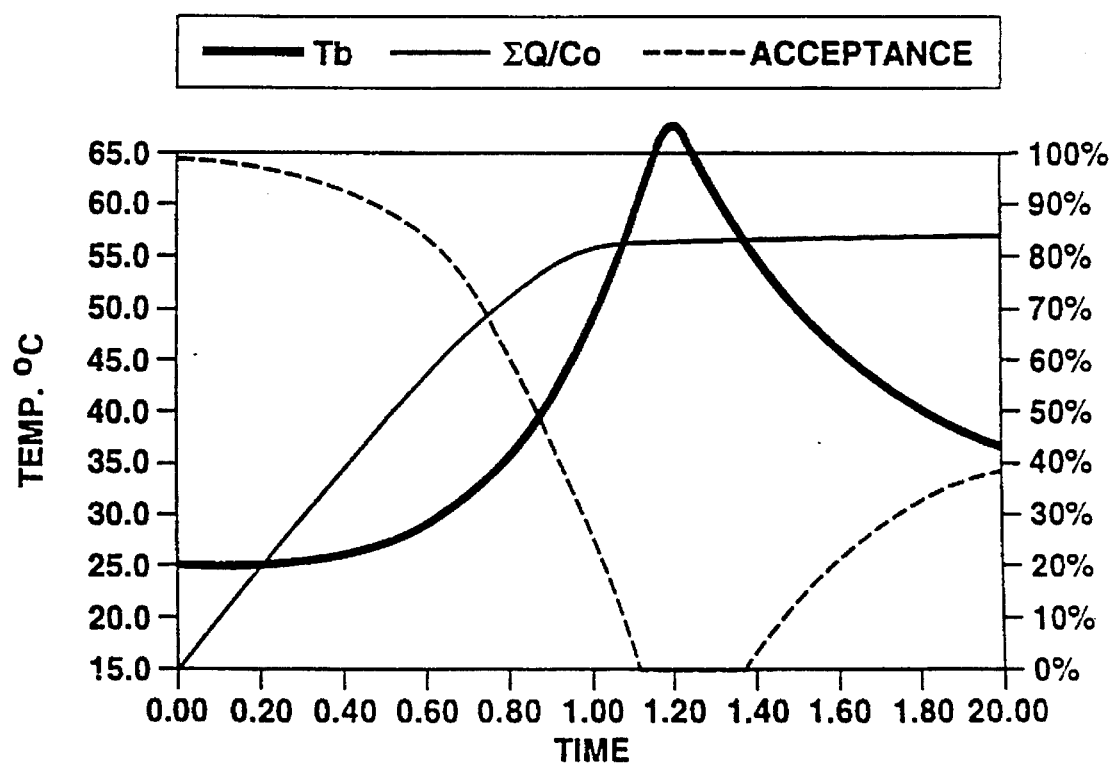

Referring to FIGS. 4A–C, illustrative graphical representations of the model used to derive the battery conditions triggering state transitions are shown. Specifically, the graphs show battery temperature (with a thick solid line), charge acceptance (with a dashed line), and cumulative supplied charge (with a thin solid line). The horizontal axis marks time in hours, the left vertical axis marks temperature in degrees Celsius, and the right vertical axis marks percentage of rated charge. The parameters illustrated in the graphs of FIGS. 4A–C are given by the following equation which models the behavior of a battery under charge:

$$\text{Charge Acceptance} = 1 - \left[ \frac{e^{\frac{Q(t)-X(T)}{C_o}}}{\sigma(T)} \right]^n \quad (2)$$

where Q(t) represents the integral of the charging current with respect to time, $C_o$ represents the rated charge capacity of the battery, X(T) represents the actual capacity of the battery, and n varies in accordance with battery type and may be determined empirically by matching the resulting charge acceptance curve with battery manufacturer data. The term $\sigma(T)$ represents a temperature dependent spreading factor which determines the slope of the charge acceptance. Temperature dependent terms X(T) and $\sigma(T)$ are given as follows:

$$X(T) = X(T_o) \cdot \left[ 1 + \left( \frac{T_o - T}{T_r} \right) \right] \quad (3)$$

$$\sigma(T) = \sigma(T_o) \cdot \exp\left( \frac{T - T_{ro}}{T_{r2}} \right) \quad (4)$$

where To is a reference temperature, and variables Tr, Tro, and Tr2 are related to the battery type and may be determined empirically by matching the resulting charge acceptance curve with battery manufacturer data.

FIG. 4A illustrates the charging of an exemplary 1100 milliamp-hour 1.5 volt NiMH cell at a ten hour, or C/10 rate. The initial phase of charging is characterized by a relatively high charge acceptance and a low battery temperature. More particularly, during the initial charging phase which spans zero to approximately nine hours, the battery charges from its discharged state to approximately 80% of its fully charged state.

During an intermediate charging phase, the battery charges from approximately 80% to approximately 95% of its fully charged state. At the beginning of the intermediate phase, the battery has a charge acceptance of approximately 60%, so that approximately 40% of the input charge is being dissipated as heat. The battery temperature rises during this phase which, in the illustrative charging of FIG. 4A, spans from approximately nine to twelve hours.

Once the final phase is entered, the battery should be nearly at full charge, as the charge acceptance, the battery temperature, and the percent of rated charge have reached steady state. The final phase spans from twelve to beyond twenty hours. During the final phase, the battery is ready to be disconnected from the circuit 32 and placed into service.

Given the model of battery charging behavior of equation 1, the charge acceptance can be determined at any time during the charging cycle if the charging rate and the time under charge are known. Moreover, with accurate knowledge of the charge acceptance, the maximum current that the battery can safely accept can be determined and supplied.

Referring now to FIG. 4B, parameters corresponding to the charging of a battery from an initial non-zero state of charge are shown. That is, the battery begins the initial phase of charging already at 40% of its rated charge. As is apparent from a comparison of FIGS. 4A and 4B, the boundary between the initial charging phase and the intermediate phase is located further left when the battery is charged from the 40% point in FIG. 4B. Knowledge of the battery temperature allows the model to re-establish congruence with the actual state of charge. This is because the boundary between the initial and intermediate phases occurs after the battery temperature has risen approximately 2.5° C. Once this common temperature rise occurs, the remaining intermediate and final charging phases are identical, albeit at occurring at different times, as evident from a comparison of the horizontal time axes of FIGS. 4A–B.

With the battery model provided by equation (1) above, the charge acceptance can be determined for any values of charging current at any time during the charging cycle. Moreover, this information can be used to determine the maximum current that a battery can safely accept. Additionally, if the battery initial state of charge is non-zero, knowledge of the temperature rise of the battery allows the model to re-establish congruence with the actual state of charge of the battery so that the charging cycle can be varied accordingly.

The charge acceptance, battery temperature, and cumulative supplied charge of a battery initially charged at a 1C rate are shown in FIG. 4C to illustrate the significant dependence of the charge acceptance on the battery temperature and the resulting limitations on the acceptable charge rate. After the initial charge phase, which terminates at about the one hour point, the battery is charged at a C/10 rate. A significant battery temperature rise occurs at approximately 1.2 hours due to the time lag associated with the thermal mass of the battery. This temperature rise causes the charge acceptance to drop to near zero. While the charge acceptance "recovers" to approximately 40% after the battery cools somewhat, the state of charge of the battery reaches only approximately 80–85% of its 100% charge. Thus, this illustration reveals the disadvantage of permitting the temperature of the battery to rise so as to degrade the battery charge acceptance to a point where the ability of the battery to fully charge is sacrificed.

With observations from the illustrative representations of the model of equation 1, advantageous charging conditions are established. Specifically, during a high current, initial charging phase (state 1) the battery is charged to 0.9.CIN (i.e., 80% of the battery rated charge). However, this phase is terminated prematurely (i.e., before 0.9.CIN is supplied) if the battery temperature exceeds 40° C. (since such a temperature indicates that the charge acceptance is decreasing to an unacceptable level, as shown in FIG. 4C) or if the battery voltage has peaked (since if the battery voltage starts to decrease gasses are being created in the battery which do not contribute to its charging, rendering any further high current charging inefficient). The intermediate charging phase is divided into a high temperature servo state (i.e., state 2) during which the battery is charged with an additional 0.3.CIN quantity of charge and a subsequent low temperature servo state (i.e., state 3) during which the battery is charged with an additional 0.4.CIN quantity of charge. These termination points or durations are selected to maintain an acceptable level of charge acceptance and to maximize the rate at which the battery is charged. During the high temperature state 2, the battery temperature is maintained at 40° C. in view of the recognition that such a temperature does not unacceptably reduce the charge acceptance, but rather causes the charge acceptance to fall to approximately 25% once an additional 0.3.CIN of charge has been supplied. During the low temperature state 3, the battery temperature is maintained at 33.5° C. in view of the recognition that such a battery temperature will allow the battery to reach full charge (FIG. 4A) once approximately an additional 0.4.CIN quantity of charge has been supplied. Due to the relationship between charge acceptance and temperature, by changing the state (and thus also adjusting the current supplied to the battery) as a function of temperature, the current adjustment is a function of the charge acceptance. In this way, the maximum current that the battery can safely accept is supplied by maintaining the battery temperature at the predetermined values of states 2 and 3. By providing additional intermediate temperature servo states, the charge acceptance can be even more precisely maintained.

State machine 100 may be provided with a plurality of additional temperature servo states (i.e., in addition to states 2 and 3) in which intermediate battery temperatures are maintained. By maintaining the battery temperature at such a plurality of temperatures, the charge acceptance can be more closely maintained within a desired percentage range, for example to ensure that the charge acceptance does not fall below a predetermined level. In one illustrative example, an additional state of operation occurring between states 2 and 3 is provided in which the battery temperature is maintained at approximately 36.75° C. With this arrangement, the charge acceptance level is maintained between approximately 20% and 30% (see FIG. 4A) throughout the intermediate charging phase comprising state 2, the intermediate temperature servo state in which the temperature is maintained at 36.75° C., and state 3. Note that the greater the number of temperature servo states comprising the intermediate charging phase, the greater the ability to precisely maintain a desired charge acceptance percentage.

Figure 5A:
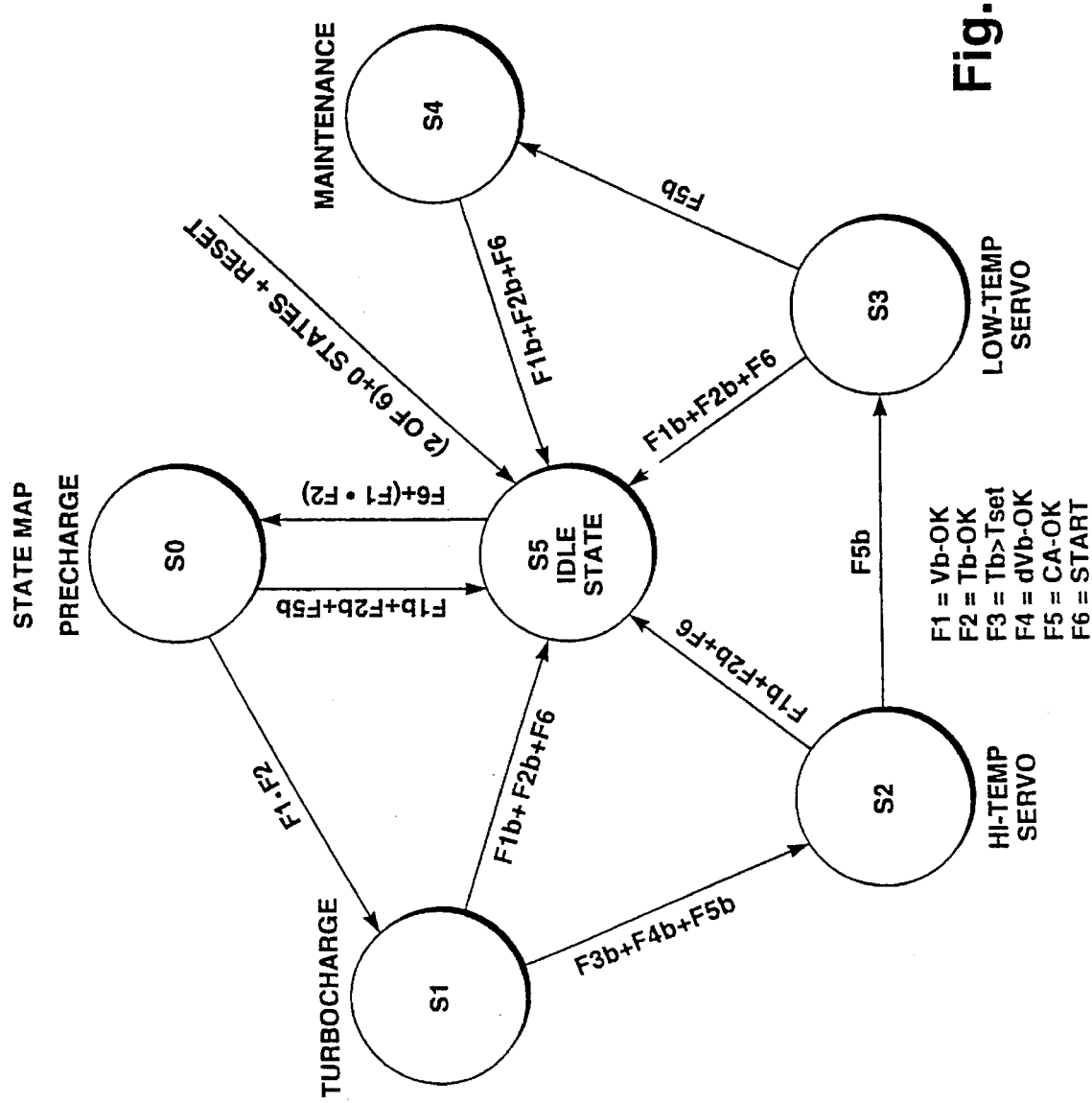
FIG. 5A is a state map of the finite state machine of FIG. 3A.
Figure 5B:
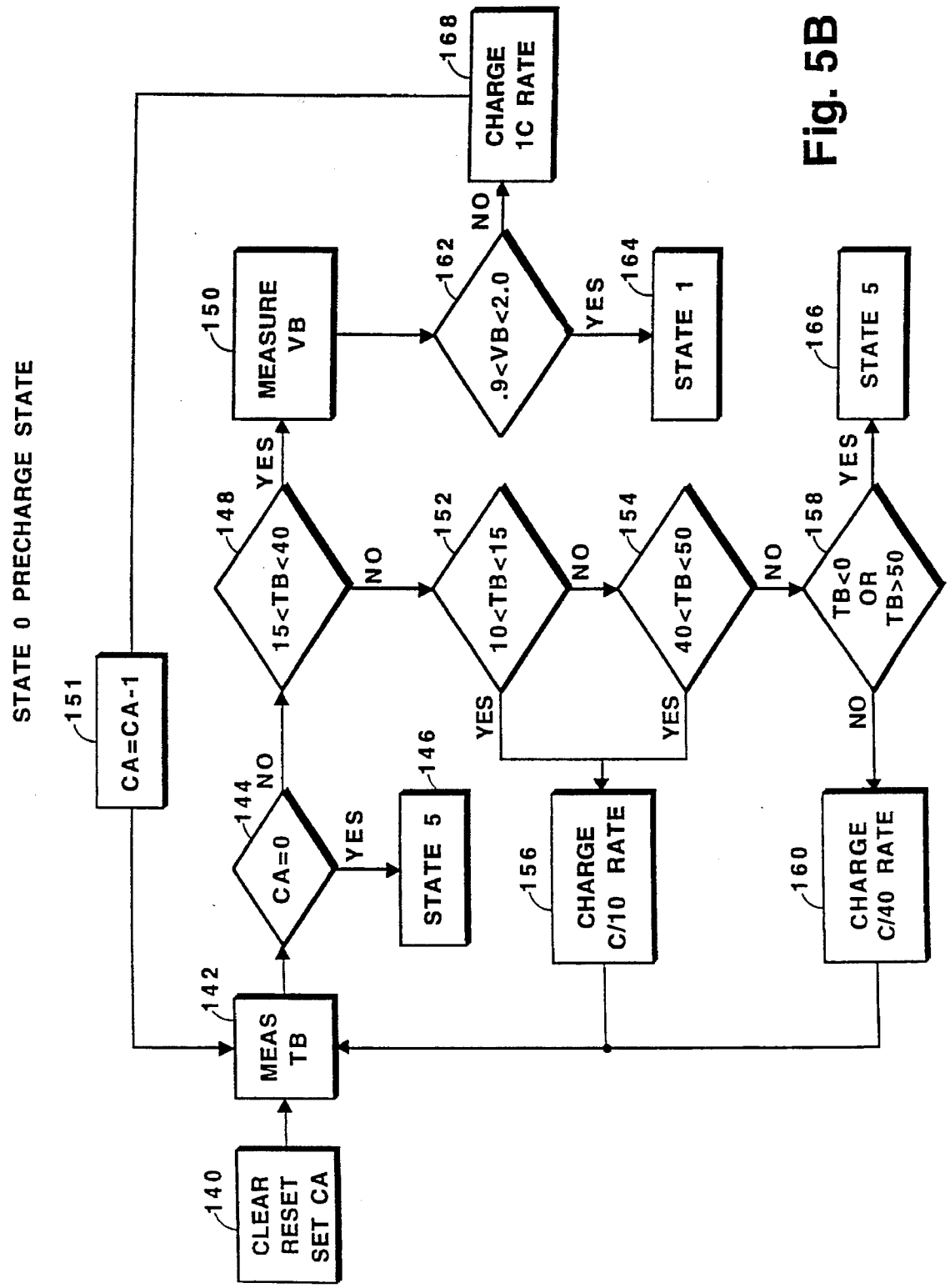
FIGS. 5B–5G are flow diagrams of the states of operation of the finite state machine of FIG. 3A.
Figure 5C:
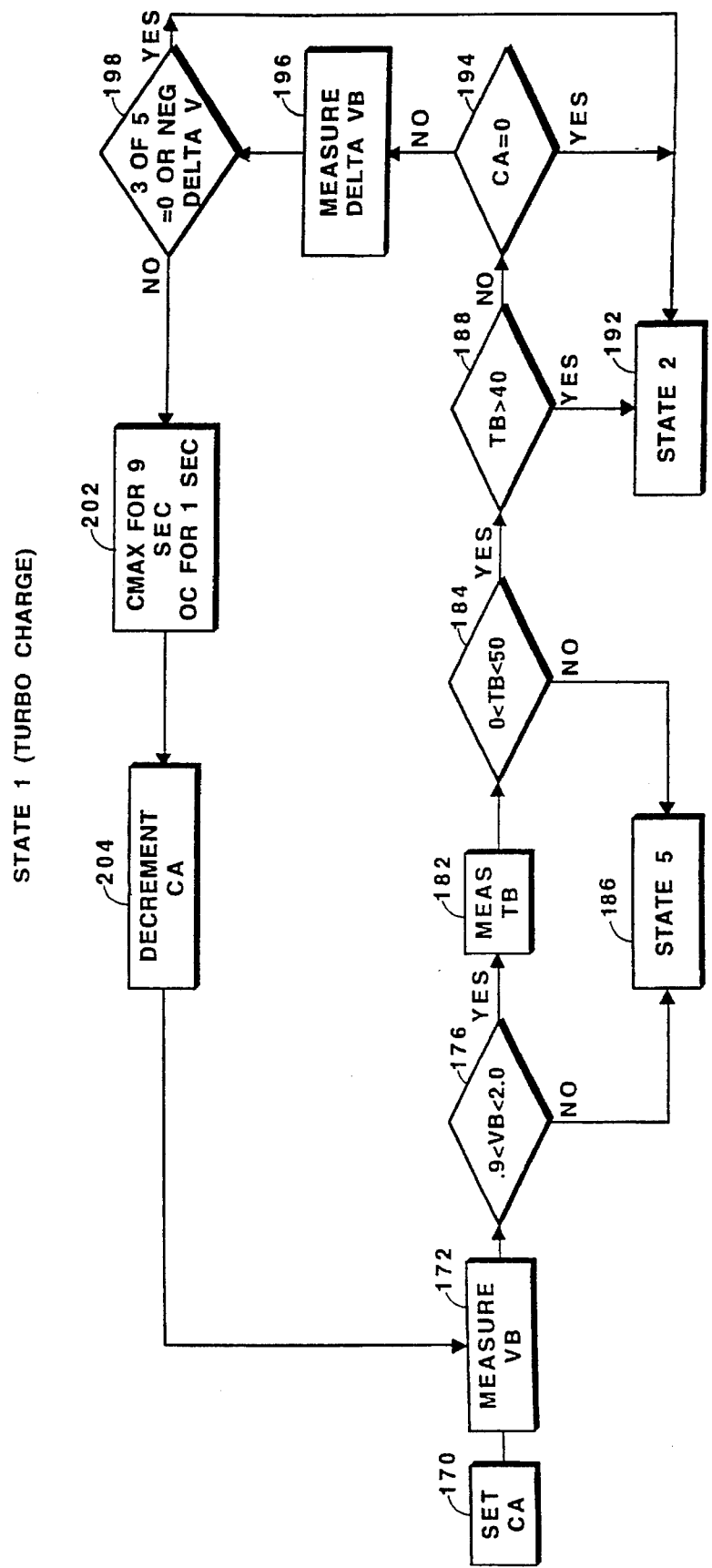
Figure 5D:
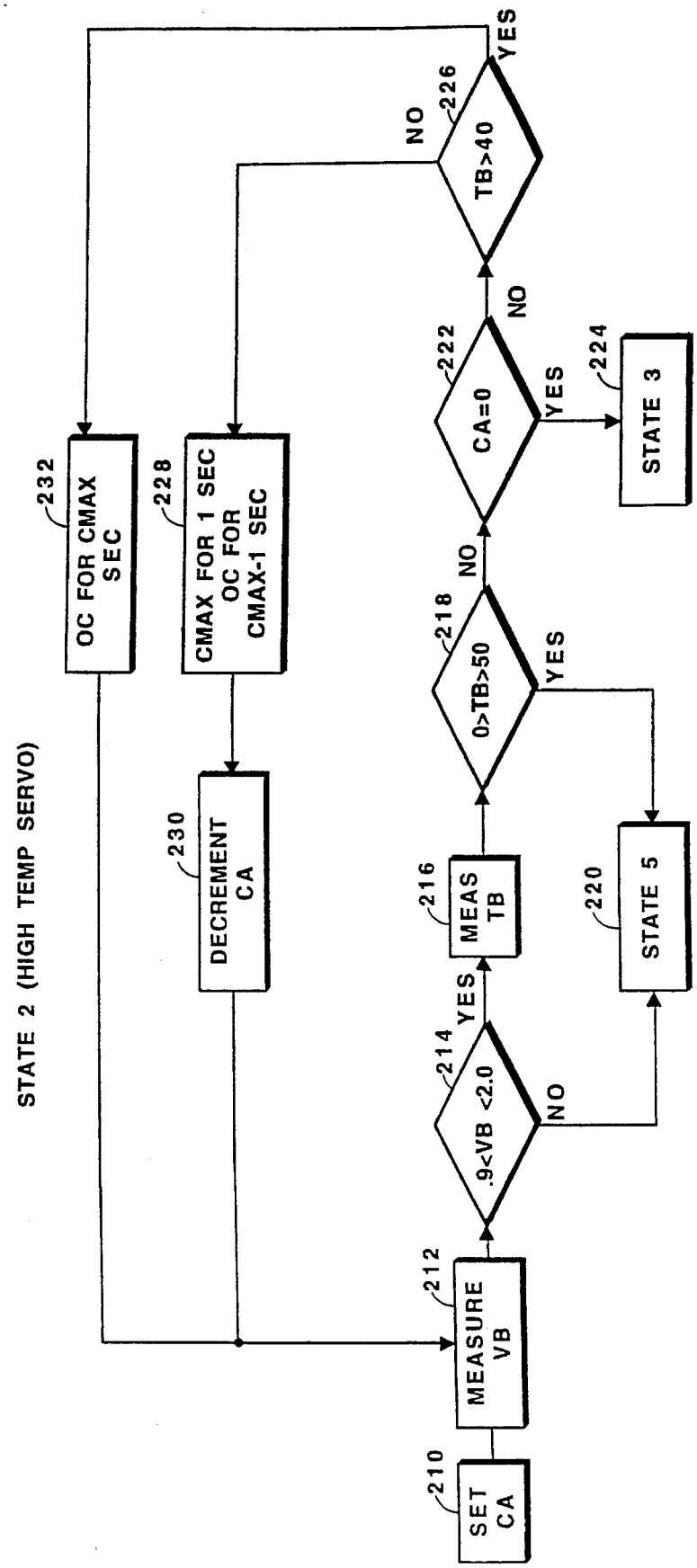
Figure 5E:
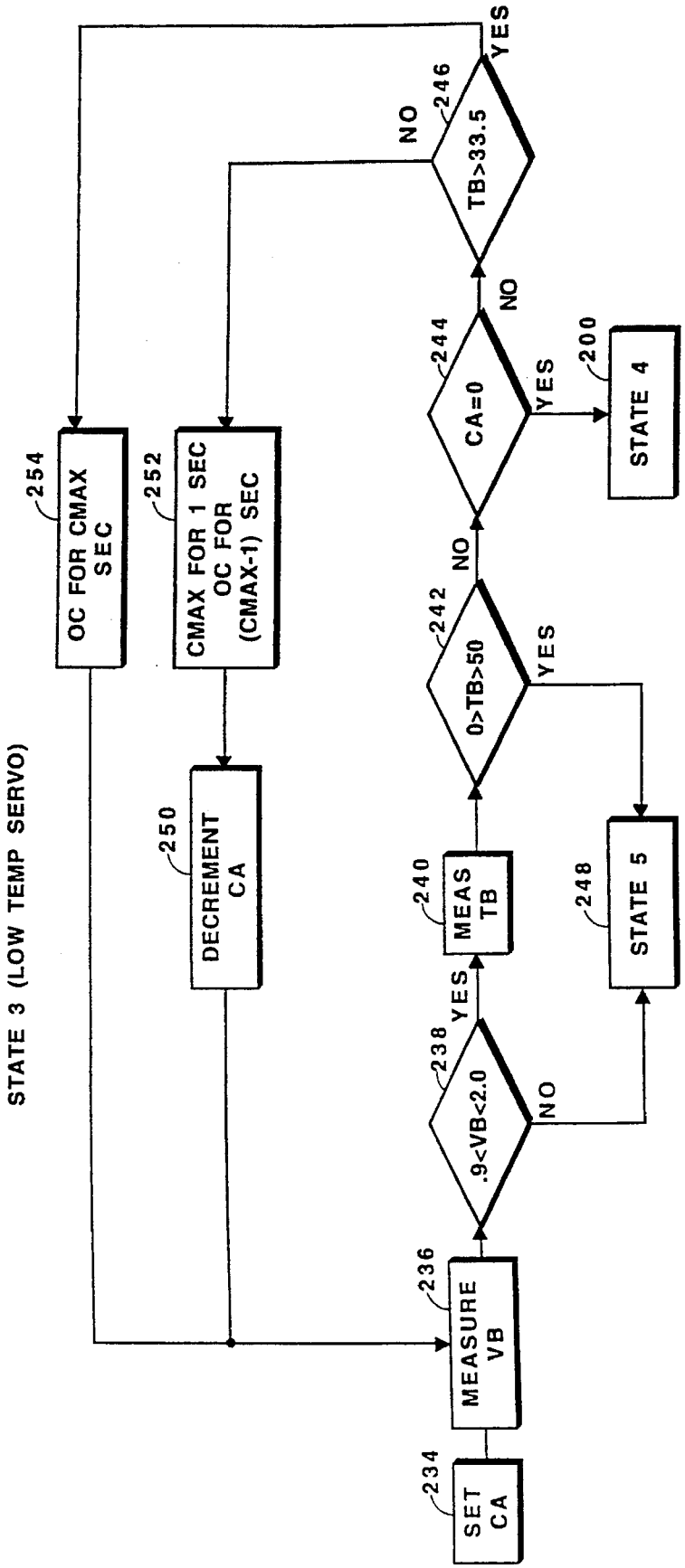
Figure 5F:
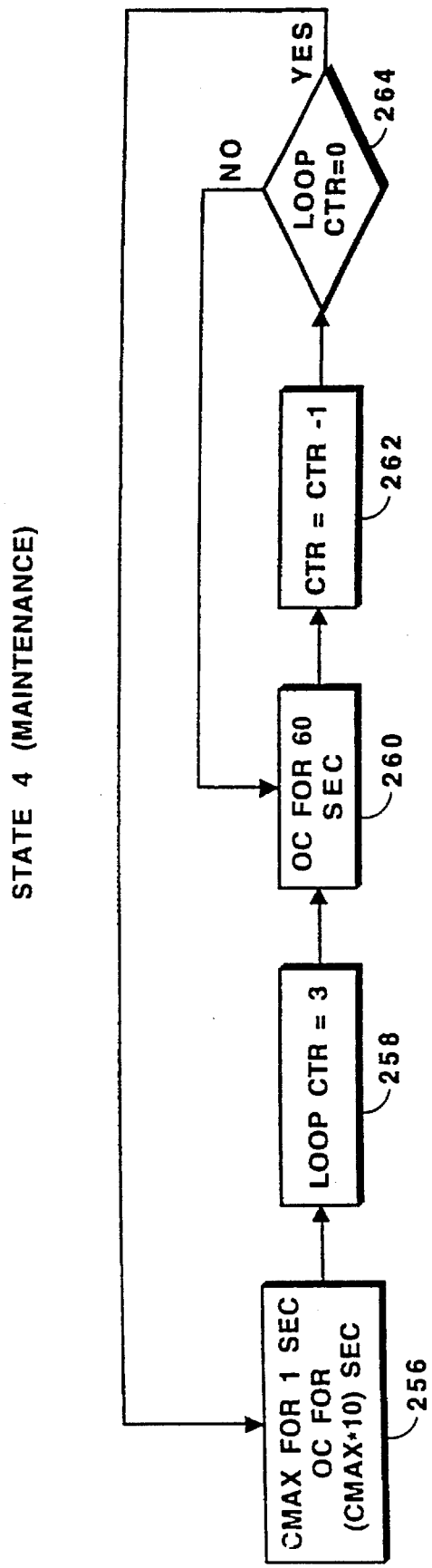
Figure 5G:
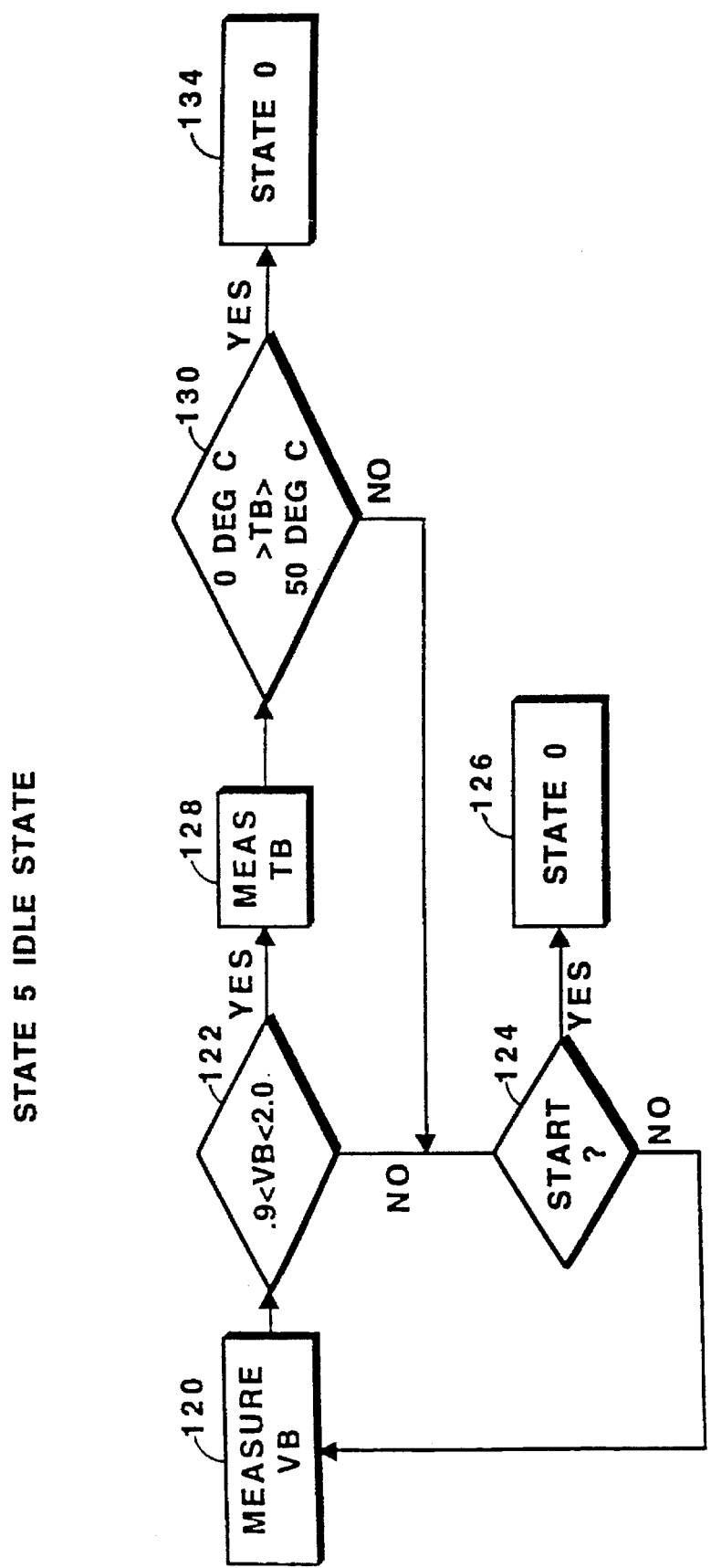

Referring to FIGS. 5A–5F, the states of operation of the battery charger circuit 32 are shown. As noted above, the occurrence of any one of multiple conditions can trigger the transition between the initial, intermediate, and final charging phases, which are controlled by six states of the state machine 100. Specifically, the circuit 32 initially enters an idle state (state 5 of FIG. 5G). During a typical battery charge cycle, a pre-charge state, referred to as state 0 (FIG. 5B), is entered after the idle state 5. An initial, high current charging phase corresponds to state 1 (FIG. 5C). The intermediate phase corresponds to states 2 and 3 (FIGS. 5D–E). And, a final, maintenance charging phase corresponds to state 4 (FIG. 5F).

The state map of FIG. 5A lists various state transition triggering conditions which are: F1 indicating that the battery voltage is within a predetermined acceptable range, F2 indicating that the battery temperature is within a predetermined acceptable range, F3 indicating that the battery temperature is greater than a predetermined temperature value, F4 indicating that a battery voltage is rising (i.e., a peak has not been detected), F5 indicating that the charge accumulator has not reached a zero count value, and F6 indicating that a start command has been received. Note that the "b" prefix to the conditions F1–F6 shown on the state map indicates a logical inversion.

The circuit 32 is initialized (i.e., the state machine 100 enters state 5) in response to one of three conditions: either (1) two of the six states are entered simultaneously; (2) no states have been entered; or (3) a reset command (i.e., the reset signal) is generated by the state machine 100 at power up. Thereafter, only state 0 may be entered, as will occur in response to one of two conditions, generally: either (1) a start command is received or (2) the battery voltage and the battery temperature are within predetermined acceptable ranges.

From state 0 either the idle state 5 is re-entered or the high current charging state 1 is entered. Specifically, the idle state is re-entered if either: (1) the battery voltage is not within the predetermined range; (2) the battery temperature is not within the predetermined range; or (3) the charge accumulator has counted to zero. Alternatively, state 1 is entered if the battery voltage and temperature are within their respective predetermined acceptable ranges.

State 1 is terminated either by returning to the idle state 5 or entering the high temperature servo state 2. More particularly, the idle state 5 can be re-entered in the same manner as described above from state 0. State 2 is entered upon the occurrence of one of three conditions: (1) the battery temperature being greater than a predetermined value; (2) a detection of a peak battery voltage; or (3) receipt of a start command.

From state 2, again the idle state 5 can be re-entered in the same manner as described above from state 1. Alternatively, the low-temperature servo state 3 can be entered once the charge accumulator has counted down to a zero value. Similarly, from state 3, the idle state 5 can be re-entered as above or the maintenance state 4 can be entered once the charge accumulator has counted down to a zero value. State 4 is terminated only upon the occurrence of one of the three conditions noted above causing re-entry into the idle state 5.

Referring initially to the steps of the idle state 5 (FIG. 5G), the battery voltage VB is measured in process step 120. If it is determined that the battery voltage VB is between 0.9 and 2.0 volts in process step 122, then the battery temperature is measured in step 128. If the battery temperature is between 0°–50° C. in step 130, then state 0 is entered as indicated by process step 134. However, if either the battery voltage is not within the predetermined 0.9–2.0 volt range or the battery temperature is not within the predetermined 0°–50° C. range, then it is determined in step 124 whether a start command has been received. If a start command has not been received, then the process is repeated, starting with the battery voltage measuring step 120. If a start command has been received, then state 0 is entered in step 126.

Referring to FIG. 5B, the process steps of the pre-charge state 0 are shown. Having entered state 0, the charge accumulator 114 is set to a predetermined count value as determined by equation (1) above. Thereafter, in process step 142, the battery temperature is measured. In process step 144, it is determined whether the charge accumulator 114 has counted to zero. If the charge accumulator 114 is at zero, then the idle state 5 (FIG. 5G) is entered in process step 146. If however, the charge accumulator 114 is not at zero, then it is determined in process step 148 whether the battery temperature is between 15° and 40° C.

If the battery temperature falls within the predetermined range of step 148, then the battery voltage is measured in process step 150. Thereafter, if it is determined in process step 162 that the battery voltage is between 0.9 and 2.0 volts, then state 1 is entered in process step 164 since a battery with a temperature between 15°–40° C. and with a voltage between 0.9–2.0 volts is capable of accepting the high current supplied in state 1. If however, the battery voltage does not fall within the predetermined range of step 162, then the battery is charged at a 1C rate in process step 168 in order to determine, by subsequent measurements, whether the battery voltage will move to within the acceptable range of step 162. This sequence of steps continues either until the battery voltage falls within the 0.9–2.0 volt range or the charge accumulator has counted down to zero (step 144).

If the battery temperature does not fall within the predetermined range of 15°–40° C. in step 148, then it is determined whether the temperature is between 10° and 15° C. in step 152. If not, then it is determined whether the battery temperature is between 40° and 50° C. in process step 154. If the temperature is either between 10°–15° C. as determined in step 152 or between 40°–50° as determined in step 154, then the battery is charged at a relatively slow C/10 rate in step 156 in an effort to determine, by subsequent measurements, whether the battery temperature will reach a steady state value within the 15°–40° C. range of step 148 and enter state 1 as described above. For example, the battery 18 may initially fall within the ranges of steps 152 or 154 due to an ambient condition and upon charging in step 156 and subsequent measurements of steps 142, 148 may enter the acceptable temperature range of step 148.

If the battery temperature is not within the predetermined ranges of steps 152 or 154, then in step 158 it is determined whether the battery temperature is less than 0° C. or greater than 50° C. If the battery temperature is either less than 0° C. or greater than 50° C., then state 5 is entered in step 166 since such a battery is not suitable for receiving the high current of state 1. If however the battery temperature is not less than 0° C. or greater than 50° C., then it must be between 0°–10° C. and the battery is charged at a very slow C/40 rate in process step 160, again in an effort to determine whether the battery will reach a steady state temperature between 15°–40° C. in subsequent measurements. Each of the charging rates of state 0 (i.e., C/10, C/40, 1C) corresponds to a predetermined duty cycle for PWM 86. Once the battery is charged, either at the 1C rate of step 168, the C/10 rate of step 156, or the C/40 rate of step 160, the battery temperature is again measured in process step 142 and the steps of state 0 repeated, as shown.

Turning next to FIG. 5C, the steps of the high current state 1 are shown in which the charge accumulator 114 is initially set to a predetermined count value in process step 170 in accordance with equation (1) above. Thereafter, the battery voltage is measured in process step 172. If it is determined that the battery voltage does not fall between 0.9 and 2.0 volts in process step 176, then state 5 is entered as shown in process step 186. Whereas, if the voltage is between 0.9 and 2.0 volts, then the battery temperature is measured in step 182.

If the battery temperature is either less than 0° C. or greater than 50° C., then state 5 is entered in step 186, as shown. On the other hand, if the battery temperature is between 0° C. and 50° C., then process step 188 is performed in which it is determined whether the battery temperature is greater than 40° C. If the battery temperature is greater than 40° C. (i.e., between 40°–50° C.), then state 2 is entered in process step 192. If however the battery temperature is less than or equal to 40° C., (i.e., between 0°–40° C.), it is determined in process step 194 whether the charge accumulator has counted to zero.

If the charge accumulator is at zero, then a zero-dV/dt measurement is made in process step 196, as described above. In process step 198, it is determined whether three of five battery voltage measurements indicate that a peak has been reached (FIG. 3D). If a battery voltage peak is detected, then state 2 is entered since this condition indicates that gasses are being generated in the battery which do not contribute to the charging of the battery, rendering additional high current charging inefficient. Otherwise, process step 202 is performed in which the maximum charge current (i.e., CMAX) is supplied for nine seconds after which the supply of current to the battery 18 is interrupted for one second. Thereafter, the charge accumulator is decremented by one in process step 204 and the sequence of steps of state 1 is repeated, as shown.

Whenever the supply of charge current to the battery is interrupted, measurements of the battery conditions are made. More particularly, the eight functions noted above in conjunction with the measurement controller 102 are performed. The shortest interval during which the charging current is interrupted occurs during state 1 when the battery charge is interrupted for one second. The battery voltage and temperature are measured periodically during each interruption of the charging current throughout a charging cycle; whereas, the zero-dV/dt measurement is made only during each such interruption in state 1.

During state 1, the battery is charged to 0.9.CIN, where CIN is the rated current. For example, if the battery 18 is rated for 1100 mamp-hours, 0.9.CIN is equal to 990 milliamp-hours, as corresponds to a setting for the charge accumulator of sixty (see Table 2). The rate of charge during state 1 is effectively 5.4C (i.e., 9 seconds of charging at a rate of 6C and 1 second of interrupted charging, or 0.9×6). The charge accumulator is decremented once every 10 second period. Note that if the battery is initially partially charged, then the condition that causes the transition to state 2 will likely be either that the temperature has exceeded 40° C. (in step 188) or that the battery voltage has started to decrease (in step 198).

FIG. 5D shows the process flow for state 2, the first state of the intermediate charging phase, in which the battery temperature is maintained at 40° C. In process step 210, the charge accumulator 114 is set to a predetermined value in accordance with equation (1) above. Thereafter, the battery voltage is measured in step 212, after which it is determined whether such voltage is between 0.9 and 2.0 volts in step 214. If the battery voltage is within the predetermined acceptable range of step 214, then the battery temperature is measured in process step 216. Otherwise, state 5 is entered in process step 220, as shown, since such battery voltages indicate that the battery 18 is unsuitable for further charging.

If the battery temperature is either less than 0° C. or greater than 50° C., as determined in step 218, then state 5 is entered in process step 220 again, since such a battery is unsuitable for further charging. If however the battery temperature is between 0° C. and 50° C., then it is determined whether the charge accumulator is at zero, in step 222. If the charge accumulator is at zero, then state 3 is entered in step 224, since this condition indicates that the desired amount of additional charge (i.e., 0.3.CIN) has been supplied to the battery under the 40° C. battery temperature conditions. If however the charge accumulator is not equal to zero, then it is determined whether the battery temperature is greater than 40° C. in step 226.

If the battery temperature is greater than 40° C., then the charging current supplied to the battery 18 is interrupted for CMAX seconds in process step 232, after which process step 212 is again performed and the above sequence repeated. For example, if CMAX is 6C, then the supply of current to the battery is interrupted for six seconds. If however the battery temperature is less than or equal to 40° C., then the battery 18 is supplied with the maximum current CMAX for one second following which the charging current is interrupted for a duration equal to CMAX-1 second in process step 228. Thus, if CMAX is 6C, then the charging current is interrupted for five seconds. Thereafter, the charge accumulator is decremented by one in step 230, and the process steps repeated.

During the state 2 operation, the battery 18 is charged with an additional 0.3.CIN and the effective rate of charge is 1C (i.e., maximum charging current for 1 second followed by an interruption of the charging current for CMAX-1 seconds). The charge accumulator is decremented by one once during each one minute period. The target temperature for the battery is 40° C., such that if the battery temperature is greater than 40° C., charging is interrupted for one cycle and the battery temperature is measured again. If however the battery temperature is less than 40° C., then the charging cycle of state 2 is repeated.

The process steps of state 3 are shown in FIG. 5E. The steps 234–254 of low temperature state 3 are identical to those of high temperature state 2 with the exception that the battery temperature is maintained at 33.5° C. in state 3 (i.e., step 246), as opposed to 40° C. in state 2. Also, once the charge accumulator is at zero, state 4 is entered (i.e., step 200), as opposed to state 3.

During state 3, the battery is charged with an additional 0.4.CIN and the effective charging rate is 1C (i.e., maximum charging current for 1 second followed by an interruption of charging for CMAX-1 seconds). Once every one minute period, the charge accumulator is decremented by one. The target temperature during state 3 is 33.5° C. so that if the battery temperature exceeds 33.5° C., one period is permitted to lapse without charging and the temperature is measured again. If however the temperature is less than 33.5° C., then the cycle is repeated. A transition from state 3 to state 4 occurs only once the charge accumulator reaching zero (i.e., 1.6.CIN cumulatively having been supplied to the battery as is necessary for full charging).

Referring now to FIG. 5F, the steps performed in maintenance state 4 are shown. Initially, the battery is supplied with the maximum charge current for one second, after which the charging current flow is interrupted for a duration of CMAX times ten seconds in process step 256. For example, if the maximum charge rate is 6C, then the supply of charging current is interrupted for 60 seconds. Thereafter, in step 258, a loop counter (i.e., the shift register 318 of the timing generator in FIG. 3E) is set to three. The supply of charging current to the battery 18 is then interrupted for 60 seconds in process step 260, following which the loop counter is decremented by one. In process step 264, it is determined whether the loop counter has reached zero. If the counter is at zero, the process steps of state 4 repeat, as occurs once every three, one minute cycles). With this arrangement, the battery is maintained at its full rated charge during state 4.

Figure 6A:
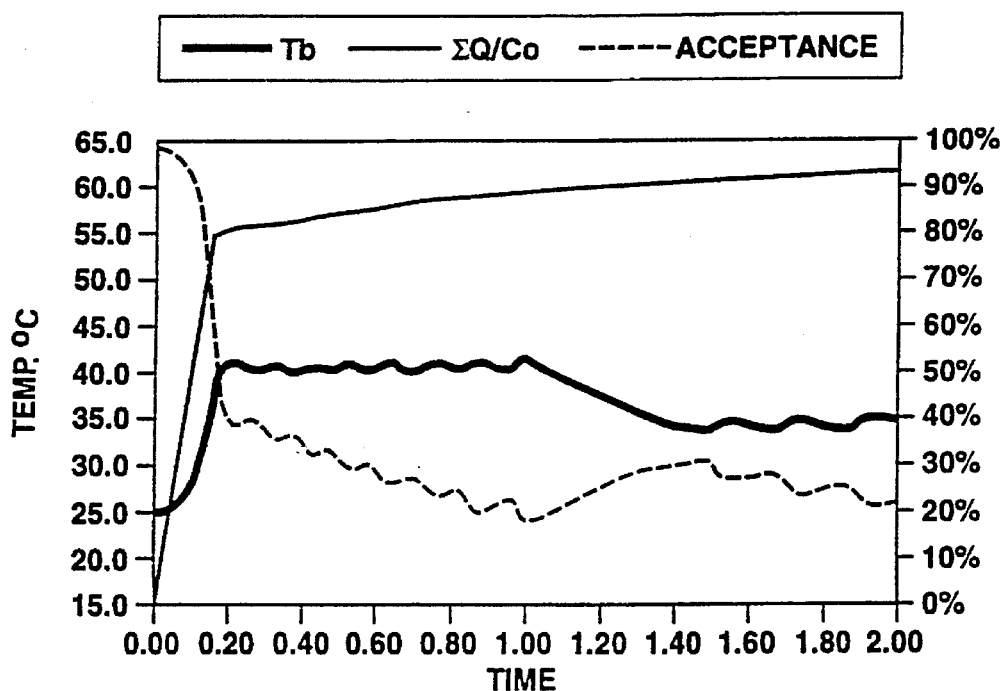
FIGS. 6A–6B are graphical representations of the charge acceptance, battery temperature, and cumulative supplied charge parameters of exemplary batteries charged with the circuit of the present invention under two separate environmental conditions.
Figure 6B:
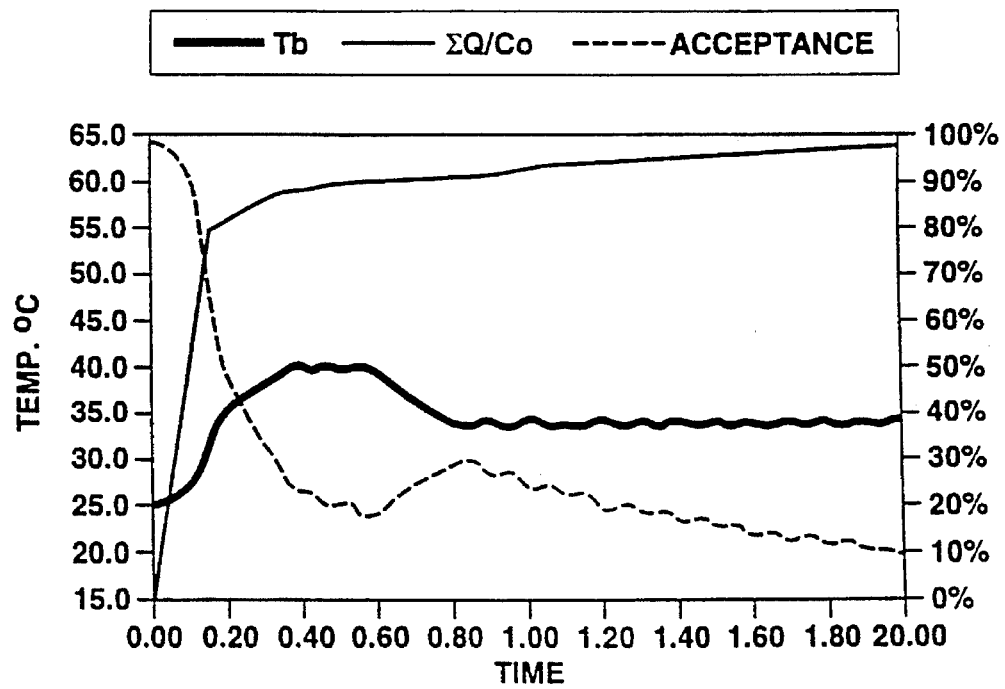

FIGS. 6A–6B illustrate the charge acceptance, battery temperature, and cumulative supplied charge of a battery 18 charged with the circuit 32. Referring specifically to FIG.

6A, the intermediate phase of charging is entered at approximately 0.2 hours, at which time state 2 is entered and the battery temperature is maintained at approximately 40° C. During this period of maximum charging, it is noteworthy that the charge acceptance does not approach zero, but rather remains between approximately 20 and 40%. State 2 charging brings the state of charge of the battery to approximately 90% of its full charge and terminates at approximately one hour. Thereafter, state 3 is entered during which the battery temperature is maintained at 33.5° C. During state 3 charging, the battery is brought from 90 to 100% of its full charge.

FIG. 6B represents the charging of a battery having a reduced thermal resistance as compared to that charged as shown in FIG. 6A, in order to illustrate the adaptive nature of the charging circuit 32. As is expected, when the thermal resistance is reduced, increased current can be supplied to a battery before an undesirably high temperature rise occurs. As with the curves of FIG. 6A specifically, transitions between the initial and intermediate charging phases and the intermediate and final charging phases occur at approximately the 80% and 90% of full charge points, respectively. Due to the reduced thermal resistance however, the circuit 32 has charged the battery to 90% of its full charge at approximately 0.5 hours, as contrasted to the 1.2 hours of FIG. 6A.

Having described preferred embodiments of the invention, it will be apparent to one of skill in the are that other embodiments incorporating their concepts may be used. Accordingly, the invention should be limited only by the spirit and scope of the appended claims.

We claim:

1. A circuit for charging a rechargeable battery, comprising:
   a temperature sensor coupled to said battery to provide a battery temperature signal indicative of the temperature of said battery;
   a voltage sensor coupled to said battery for providing a battery voltage signal indicative of the voltage across said battery;
   an adjustable current source for providing current to said battery; and
   a processor receiving said battery temperature signal and said battery voltage signal, for providing a feedback signal to said current source to adjust said current provided to said battery in order to maintain said battery temperature at a predetermined value for a predetermined duration, wherein said predetermined value of said battery temperature and said predetermined duration are selected in order to maintain the charge acceptance of said battery above a predetermined percentage.

2. The circuit recited in claim 1 wherein said predetermined value of said battery temperature is selected based on a model of a battery under charge correlating charge acceptance, battery temperature, and cumulative supplied current parameters.

3. The circuit recited in claim 2 wherein said processor includes a state machine having state transitions which are based on said model.

4. The circuit recited in claim 1 wherein said predetermined value of said battery temperature is adjustable.

5. The circuit recited in claim 1 wherein said predetermined value of said battery temperature is approximately 40° C. for a first predetermined duration.

6. The circuit recited in claim 1 wherein said processor provides said feedback signal to said current source to adjust said current provided to said battery in order to maintain said battery temperature substantially at a second, lower predetermined value of approximately 33.5° C. for a second predetermined duration.

7. The circuit recited in claim 1 further comprising a peak detector coupled to said battery for providing a signal indicating whether a peak of said battery voltage has occurred.

8. A circuit for charging a rechargeable battery, comprising:
   a temperature sensor coupled to said battery to provide a battery temperature signal indicative of the temperature of said battery;
   a voltage sensor coupled to said battery for providing a battery voltage signal indicative of the voltage across said battery;
   an adjustable current source for providing current to said battery; and
   a processor, receiving said battery temperature signal and said battery voltage signal for providing a feedback signal to said current source to adjust said current provided to said battery in order to maintain said battery temperature at a predetermined value for a predetermined duration, wherein said predetermined duration is a function of the cumulative charge supplied to said battery.

9. A battery charger circuit comprising:
   an adjustable current source for supplying a charging current to a re-chargeable battery with an adjustable duty cycle, said duty cycle of said charging current being adjustable in response to a control signal to adjust the effective level of said charging current;
   a battery temperature sensor for measuring the temperature of said battery; and
   a processor receiving said battery temperature measurement for generating said control signal, said processor including a state machine having a first state of operation during which said battery temperature is maintained substantially at a first predetermined temperature and a second state of operation during which said battery temperature is maintained substantially at a second, lower predetermined temperature, wherein said state machine has an initial state corresponding to an initial charging phase during which an initial level of charging current is supplied to said battery.

10. The circuit recited in claim 9 wherein said state machine has a final state corresponding to a final charging phase during which the battery is maintained at full charge.

11. The circuit recited in claim 9 further comprising a battery voltage sensor for measuring the voltage across said battery.

12. The circuit recited in claim 9 wherein said predetermined temperature at which said battery is maintained during said first state is approximately 40° C.

13. The circuit recited in claim 9 wherein said predetermined temperature at which said battery is maintained during said second state is approximately 33.5° C.

14. A battery charger circuit comprising:
   an adjustable current source for supplying a charging current to a re-chargeable battery with an adjustable duty cycle, said duty cycle of said charging current being adjustable in response to a control signal to adjust the effective level of said charging current;
   a battery temperature sensor for measuring the temperature of said battery; and
   a processor receiving said battery temperature measurement for generating said control signal, said processor including a state machine having a first state of operation corresponding to an initial charging phase during which a first level of charging current is supplied to said battery, a second state of operation corresponding to an intermediate charging phase during which said battery temperature is maintained at or below a predetermined temperature, and a third state corresponding to the intermediate charging phase during which said battery temperature is maintained at or below a second predetermined temperature, wherein each of said first, second, and third states of operation have corresponding first, second, and third durations corresponding to predetermined values of cumulative charge supplied to said battery.

15. The circuit recited in claim 14 wherein said predetermined values of cumulative supplied to said battery are selected in accordance with a model of a battery under charge relating the battery temperature, charge acceptance, and cumulative charge supplied to said battery.

16. The circuit recited in claim 14 wherein said predetermined values of cumulative charge supplied to said battery are approximately 90% of the rated charge of said battery for said first state, approximately 30% of the rated charge of said battery for said second state, and approximately 40% of the rated charge of said battery for said third state.

17. A circuit for charging a rechargeable battery, said rechargeable battery having a charge acceptance percentage indicative of the percentage of incremental input current provided to said battery that is recoverable, said circuit comprising:

a temperature sensor coupled to said battery to provide a battery temperature signal indicative of the temperature of said battery;

an adjustable current source for providing current to said battery; and a processor, receiving said battery temperature signal, for providing a feedback signal to said current source to adjust said current provided to said battery in order to maintain said battery temperature substantially at a predetermined level until a predetermined amount of charge is supplied to said battery.

18. The circuit recited in claim 17 wherein said feedback signal adjusts said current so as to maintain said battery temperature at a plurality of predetermined levels until a corresponding plurality of amounts of charge supplied to said battery.

19. The circuit recited in claim 18 wherein said processor includes a state machine having a plurality of states corresponding to said plurality of predetermined levels of battery temperature.

20. The circuit recited in claim 17 wherein said adjustable current source includes means for varying the average current provided to said battery.

21. The circuit recited in claim 17 wherein said battery temperature signal is indicative of a temperature rise of said battery.

22. A method for charging a rechargeable battery comprising the steps of:

sensing the temperature of said battery;

supplying a charging current to said battery until said battery temperature reaches a first predetermined value;

maintaining the temperature of said battery substantially at said first predetermined value for a first predetermined duration, wherein said first predetermined duration is a function of cumulative charge supplied to said battery.

23. The method recited in claim 22 wherein said temperature maintaining step further comprising the steps of:

interrupting said charging current supplied to said battery for a second predetermined duration if said battery temperature exceeds said first predetermined value; and supplying said charging current to said battery for a third predetermined duration if said battery temperature does not exceed said first predetermined value.

24. The method recited in claim 22 further comprising the step of maintaining the temperature of said battery substantially at a second predetermined value for a second predetermined duration.

25. A circuit for charging rechargeable battery, comprising:

a temperature sensor in thermal communication with said battery to provide a battery temperature signal indicative of the temperature of said battery;

a voltage sensor coupled to said battery for providing a battery voltage signal indicative of the voltage across said battery;

an adjustable current source for providing current to said battery; and a processor, receiving said battery temperature signal and said battery voltage signal for providing a feedback signal to said current source causing said current source to supply a high charging current to said battery during an initial charging phase which is terminable when said battery temperature reaches a predetermined value and to provide a lower charging current to said battery during a temperature controlled phase so as to maintain said battery temperature substantially at said predetermined value for a predetermined duration, wherein said temperature controlled phase is entered when said battery temperature reaches said predetermined value or when a predetermined amount of charge has been supplied to said battery.

* * * * *

UNITED STATES PATENT AND TRADEMARK OFFICE
CERTIFICATE OF CORRECTION

PATENT NO. : 5,504,416
DATED : April 2, 1996
INVENTOR(S) : Peter R. Holloway, et al.

It is certified that error appears in the above-identified patent and that said Letters Patent is hereby corrected as shown below:

Column 3, line 44, "responsive to a" should read --including a--.

Column 20, claim 8, line 19, "signal for" should read --signal, for--.

Column 21, claim 15, line 16, "cumulative supplied" should read --cumulative charge supplied--.

Column 21, claim 18, line 45, "charge supplied" should read --charge are supplied--.

Column 22, claim 25, line 40, "signal for" should read --signal, for--.

Signed and Sealed this

First Day of December, 1998

Attest:

BRUCE LEHMAN

*Attesting Officer*  Commissioner of Patents and Trademarks